US012571981B2

(12) United States Patent
Ishikawa et al.

(10) Patent No.: US 12,571,981 B2
(45) Date of Patent: Mar. 10, 2026

(54) OPTICAL ELEMENT DRIVING DEVICE WITH VOLTAGE BOOSTED PIEZOELECTRIC ELEMENT, CAMERA MODULE, AND CAMERA-MOUNTED DEVICE

(71) Applicants: Masahiro Ishikawa, Tokyo (JP);
Tomohiko Osaka, Tokyo (JP)

(72) Inventors: Masahiro Ishikawa, Tokyo (JP);
Tomohiko Osaka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 73 days.

(21) Appl. No.: 18/685,550

(22) PCT Filed: Aug. 19, 2022

(86) PCT No.: PCT/JP2022/031306
§ 371 (c)(1),
(2) Date: Feb. 22, 2024

(87) PCT Pub. No.: WO2023/026965
PCT Pub. Date: Mar. 2, 2023

(65) Prior Publication Data
US 2024/0353650 A1     Oct. 24, 2024

(30) Foreign Application Priority Data

Aug. 26, 2021    (JP) ................................. 2021-138403

(51) Int. Cl.
*G02B 7/09*        (2021.01)
*G02B 7/02*        (2021.01)
*H04N 23/54*       (2023.01)

(52) U.S. Cl.
CPC .............. *G02B 7/09* (2013.01); *G02B 7/026* (2013.01); *H04N 23/54* (2023.01)

(58) Field of Classification Search
CPC . G02B 7/09; G02B 7/026; G02B 7/02; G02B 7/04; G02B 7/08; H04N 23/54;
(Continued)

(56) References Cited

U.S. PATENT DOCUMENTS

2007/0229702 A1    10/2007   Shirono et al.
2010/0067130 A1     3/2010   Kim et al.
(Continued)

FOREIGN PATENT DOCUMENTS

JP        2000-329987        11/2000
JP        2006-119247         5/2006
(Continued)

OTHER PUBLICATIONS

Request for Submission of an Opinion Dated Jul. 10, 2025 From the Korean Intellectual Property Office Re. Application No. 10-2024-7005874 and Its Translation Into English. (13 Pages).

*Primary Examiner* — Gevell V Selby

(57)            ABSTRACT

An optical element driving device according to the present invention comprises a moving part which is capable of holding an optical element, a driving part which drives the moving part by vibrating a piezoelectric element, and a voltage-raising part which raises input voltage that is input into the piezoelectric element, wherein the voltage-raising part has an inductor connected in series to the piezoelectric element and a capacitor connected in parallel to the piezo-electric element. A camera module according to the present invention comprises an optical element driving device and an imaging part which captures a subject image formed by an optical element. A camera-mounted device according to the present invention comprises a camera module and an image processing part which processes image information acquired by the camera module.

5 Claims, 12 Drawing Sheets

221Z                    15

(58) Field of Classification Search
CPC ........ H04N 23/00; H04N 23/50; H04N 23/57;
G03B 15/00; G03B 17/02; G03B 30/00;
G03B 3/10; G03B 13/36; G03B
2205/0061; H02N 2/04; H02N 2/06
See application file for complete search history.

(56) References Cited

U.S. PATENT DOCUMENTS

| | | | | |
|---|---|---|---|---|
| 2012/0274243 A1* | 11/2012 | Sumioka | .............. | H04N 23/811 |
| | | | | 318/116 |
| 2014/0232300 A1* | 8/2014 | Sumioka | ................ | H04N 23/52 |
| | | | | 318/126 |
| 2015/0349236 A1* | 12/2015 | Furuta | .................. | H04N 23/811 |
| | | | | 347/68 |
| 2017/0054387 A1* | 2/2017 | Sumioka | .............. | H04N 23/687 |
| 2023/0016060 A1 | 1/2023 | Sugawara | | |

FOREIGN PATENT DOCUMENTS

| | | |
|---|---|---|
| JP | 2007-135348 | 5/2007 |
| JP | 2010-072169 | 4/2010 |
| JP | 2014-140028 | 7/2014 |
| JP | 2020-013065 | 1/2020 |
| JP | 2021-092726 | 6/2021 |
| KR | 10-2007-0083753 | 8/2007 |
| KR | 10-2010-0124944 | 11/2010 |
| KR | 10-2015-0093833 | 8/2015 |
| KR | 10-2015-0122944 | 11/2015 |

* cited by examiner

M

M

OPTICAL ELEMENT DRIVING DEVICE WITH VOLTAGE BOOSTED PIEZOELECTRIC ELEMENT, CAMERA MODULE, AND CAMERA-MOUNTED DEVICE

TECHNICAL FIELD

The present invention relates to an optical element driving device for driving an optical element, a camera module and a camera-mounted device.

BACKGROUND ART

In general, a camera module is mounted in a thin camera-mounted device such as a smartphone. Such a camera module uses an optical element driving device for driving the optical element.

The optical element driving device includes an auto focus function (hereinafter referred to as "AF function"; AF: Auto Focus). With the AF function, the optical element driving device drives the lens (optical element) to automatically perform the focusing when capturing the subject.

For example, PTL 1 discloses a configuration including a lens driving part configured to move a lens in the optical axis direction, and a circuit configured to control voltage application to an actuator of the lens driving part.

CITATION LIST

Patent Literature

PTL 1
Japanese Patent Application Laid-Open No. 2020-13065

SUMMARY OF INVENTION

Technical Problem

Incidentally, in view of size reduction of lens driving devices and the like, the use of an ultrasound motor including a piezoelectric element as a driving source of a lens has been considered. Relatively large driving voltage is required to drive the ultrasound motor. In a thin camera-mounted device, input voltage from the power source is relatively small, and it is necessary to boost the input voltage by using an inductor and supply it to the ultrasound motor.

To boost the input voltage to the desired voltage, however, it is necessary to use a large inductor, but mounting a large inductor in the lens driving device may hinder the size reduction of the lens driving device. In the case where a small inductor is mounted in the lens driving device, the small inductor may change the electrical characteristics, e.g., the frequency, from the desired resonance frequency value, thus affecting the controllability of the ultrasound motor. Therefore, it is desirable to mount the inductor in the lens driving device without changing the electrical characteristics.

An object of the present invention is to provide an optical element driving device, a camera module and a camera-mounted device that can achieve size reduction without changing the electrical characteristics with the inductor mounted therein.

Solution to Problem

An optical element driving device according to the present invention includes: a movable part configured to hold an optical element; a driving part configured to drive the movable part by vibrating a piezoelectric element; and a boost part configured to boost an input voltage input to the piezoelectric element. The boost part includes an inductor connected in series to the piezoelectric element, and a capacitor connected in parallel to the piezoelectric element.

A camera module according to the present invention includes: the above-described optical element driving device; and an image capturing part configured to capture a subject image formed by the optical element.

A camera-mounted device according to the present invention is an information device or a transport device, the camera-mounted device including: the above-described camera module; and an image processing part configured to process image information obtained by the camera module.

Advantageous Effects of Invention

According to the present invention, it is possible to achieve size reduction without changing the electrical characteristics with the inductor mounted therein.

DESCRIPTION OF EMBODIMENTS

An embodiment of the present invention is elaborated below with reference to the accompanying drawings.

Smartphone

Figure 1A:
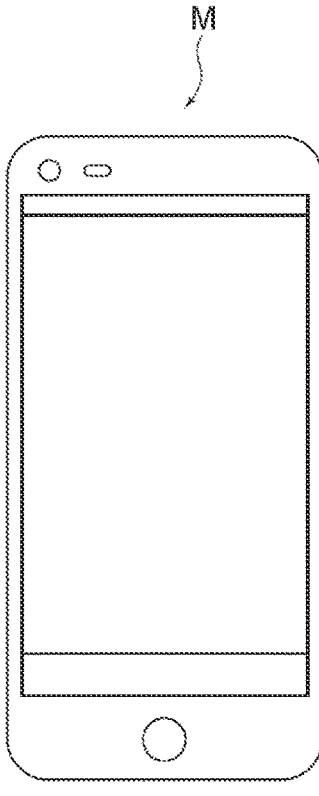
FIG. 1A is a front view illustrating a smartphone equipped with a camera module according to an embodiment of the present invention.
Figure 1B:
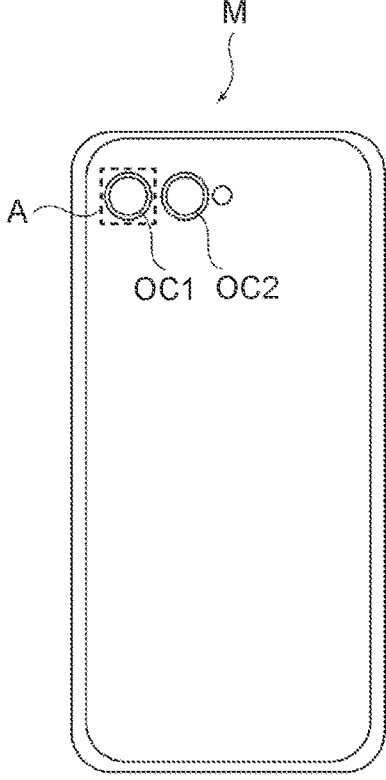
FIG. 1B is a rear view of the smartphone illustrated in FIG. 1A.

FIGS. 1A and 1B are diagrams illustrating smartphone M equipped with camera module A according to the embodiment (an example of the camera-mounted device). FIG. 1A is a front view of smartphone M, and FIG. 1B is a rear view of smartphone M.

Smartphone M includes a dual camera composed of two back surface cameras OC1 and OC2. In the embodiment, camera module A is applied to back surface cameras OC1 and OC2.

Camera module A has an AF function and a shake correction function (hereinafter referred to as "OIS function"; OIS: Optical Image Stabilization). Camera module A can capture images with no image blurring by automatically performing focusing when capturing a subject with the AF function, and optically correcting the runout (vibration) upon capturing images with the OIS function.

Camera Module

Figure 2:
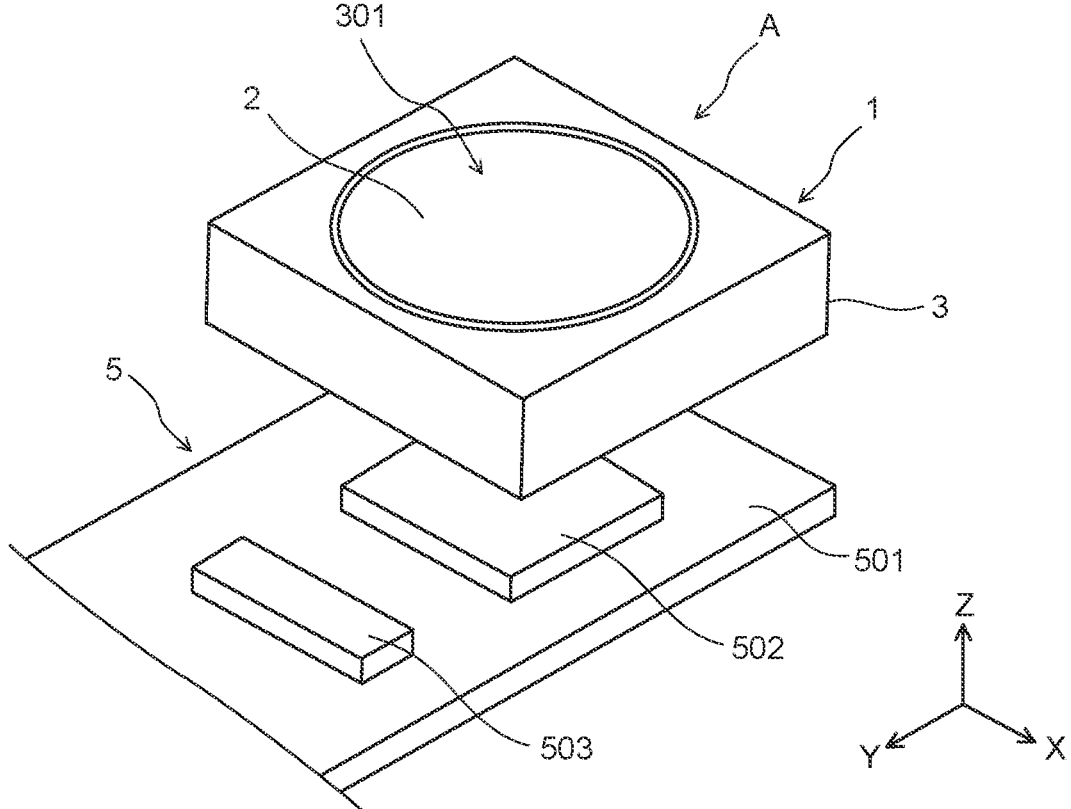
FIG. 2 is a perspective view illustrating a camera module and an image capturing part.
Figure 3:
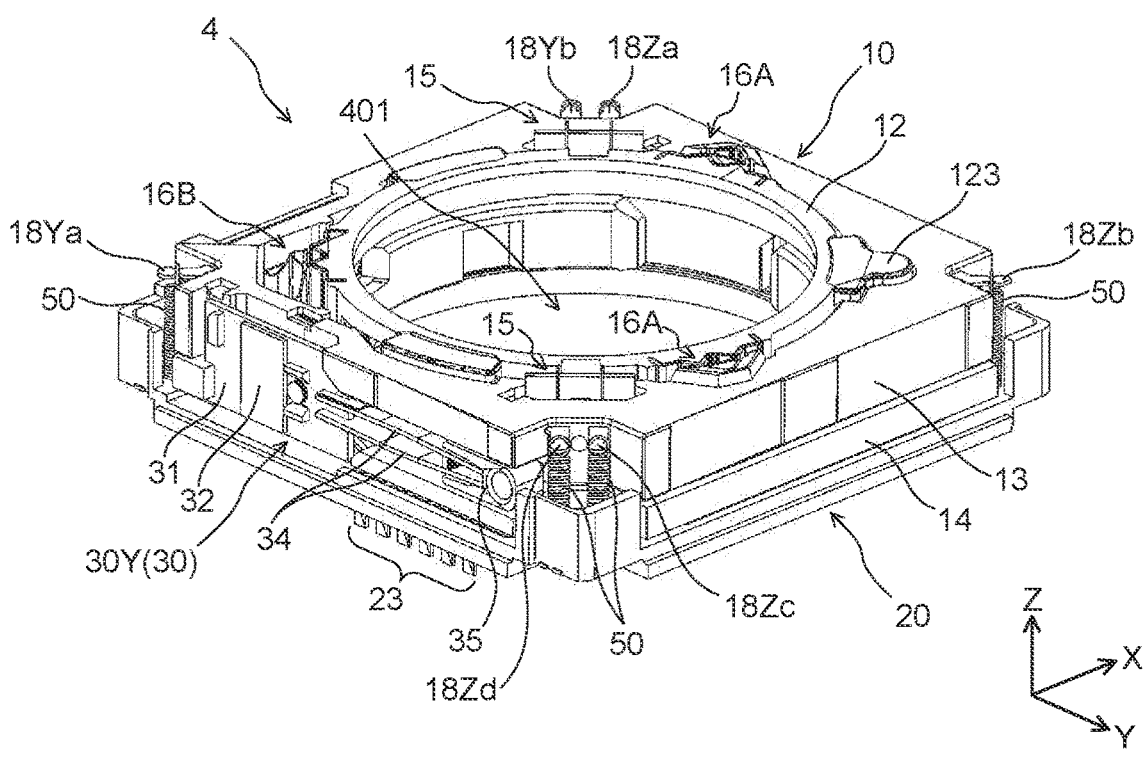
FIG. 3 is a plan view of an optical element driving device body provided in an optical element driving device of the camera module.
Figure 4:
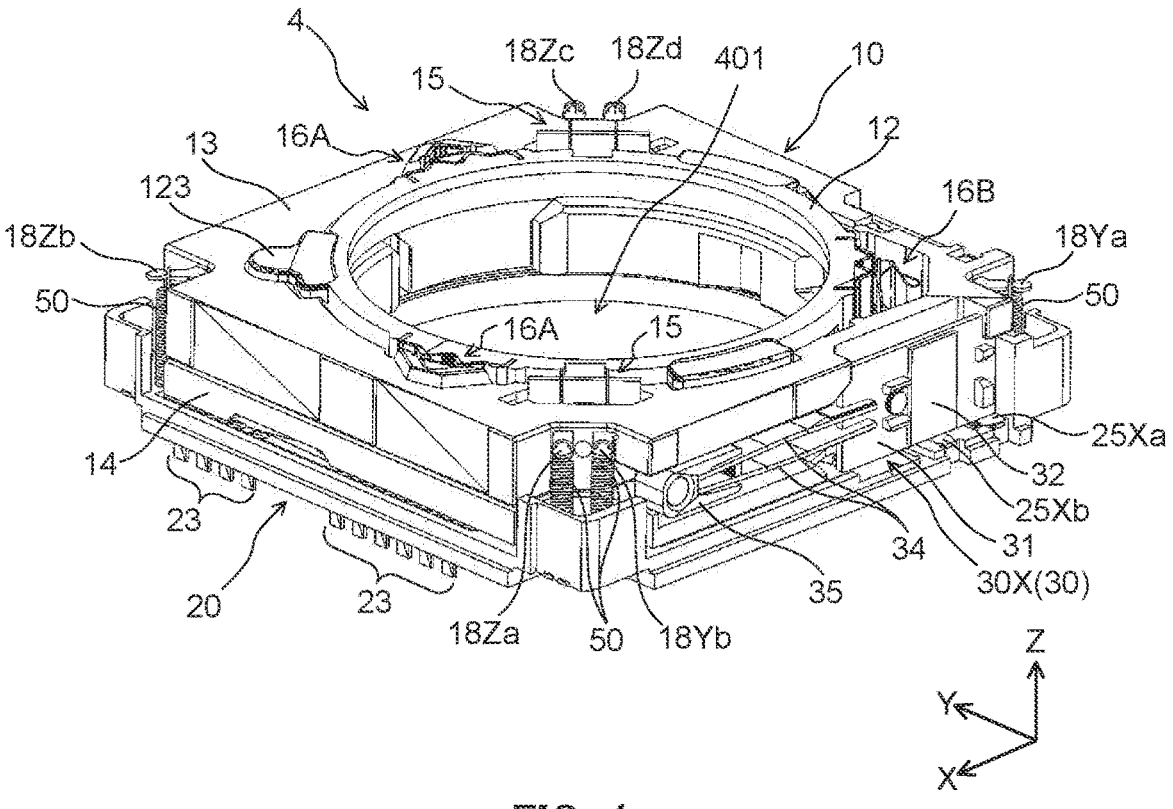
FIG. 4 is a perspective view of the optical element driving device body illustrated in FIG. 3 as viewed from a different direction.

FIG. 2 is a perspective view illustrating camera module A and image capturing part 5. FIGS. 3 and 4 are perspective views of optical element driving device body 4 provided in optical element driving device 1 of camera module A illustrated in FIG. 2. FIG. 4 is a diagram illustrating optical element driving device body 4 illustrated in FIG. 3 rotated by 180 degrees about the Z axis. As illustrated in FIGS. 2 to 4, the embodiments are described with orthogonal coordinate systems (X, Y, Z). The common orthogonal coordinate system (X, Y, Z) is used also in the drawings described later.

For example, in the case where images are captured with smartphone M, camera module A is mounted such that the X direction is the up-down direction (or left-right direction), the Y direction is the left-right direction (or up-down direction), and the Z direction is the front-rear direction. That is, the Z direction is the optical axis direction, and the upper side (+Z side) is the optical axis direction light reception side, and the lower side (−Z side) is the optical axis direction imaging side in FIGS. 2 to 4. In addition, in the following description, the X direction and the Y direction orthogonal to the Z axis are referred to as "optical axis orthogonal direction", and the XY plane is referred to as "optical axis orthogonal plane". In addition, the direction orthogonal to the optical axis is referred to as "radial direction".

As illustrated in FIG. 2, camera module A includes optical element driving device 1 that achieves the AF function and the OIS function, lens part 2 composed with a lens housed in a cylindrical lens barrel, image capturing part 5 that captures subject images formed by lens part 2, and the like. That is, optical element driving device 1 is a so-called lens driving device that drives lens part 2 serving as an optical element.

Cover

In optical element driving device 1, the outside of optical element driving device body 4 is covered with cover 3. Cover 3 is a rectangular capped square cylinder member in plan view as viewed from the optical axis direction. In the embodiment, cover 3 has a square shape in plan view. Cover 3 includes substantially semicircular opening 301 at the top surface. Lens part 2 is housed in opening 401 of optical element driving device body 4, and exposed to the outside from opening 301 of cover 3. For example, lens part 2 is configured to protrude to the optical axis direction light reception side than the opening surface of the cover 3 along with the movement in the optical axis direction. The inner wall of cover 3 is fixed by bonding to base 21 (see FIG. 5 described later) of OIS fixing part 20 of optical element driving device body 4, to house inside OIS movable part 10 and the like (see FIG. 5) together with base 21.

Cover 3 includes a member that shields electromagnetic waves from the outside of optical element driving device 1, such as a shielding member composed of a magnetic substance.

Image Capturing Part

Image capturing part 5 is disposed on the optical axis direction imaging side of optical element driving device 1. Image capturing part 5 includes, for example, image sensor substrate 501, and imaging element 502 and control part 503 mounted on image sensor substrate 501. Imaging element 502 is composed of a CCD (charge-coupled device) image sensor, a CMOS (complementary metal oxide semiconductor) image sensor or the like, and captures subject images formed by lens part 2, for example.

Control part 503 is composed of a control IC, and drives and controls optical element driving device 1, for example. Optical element driving device 1 is mounted on and mechanically and electrically connected to image sensor substrate 501. Note that control part 503 may be provided on image sensor substrate 501, or may be provided in a camera-mounted device (in the embodiment, smartphone M) where camera module A is mounted.

Optical Element Driving Device Body

Figure 5:
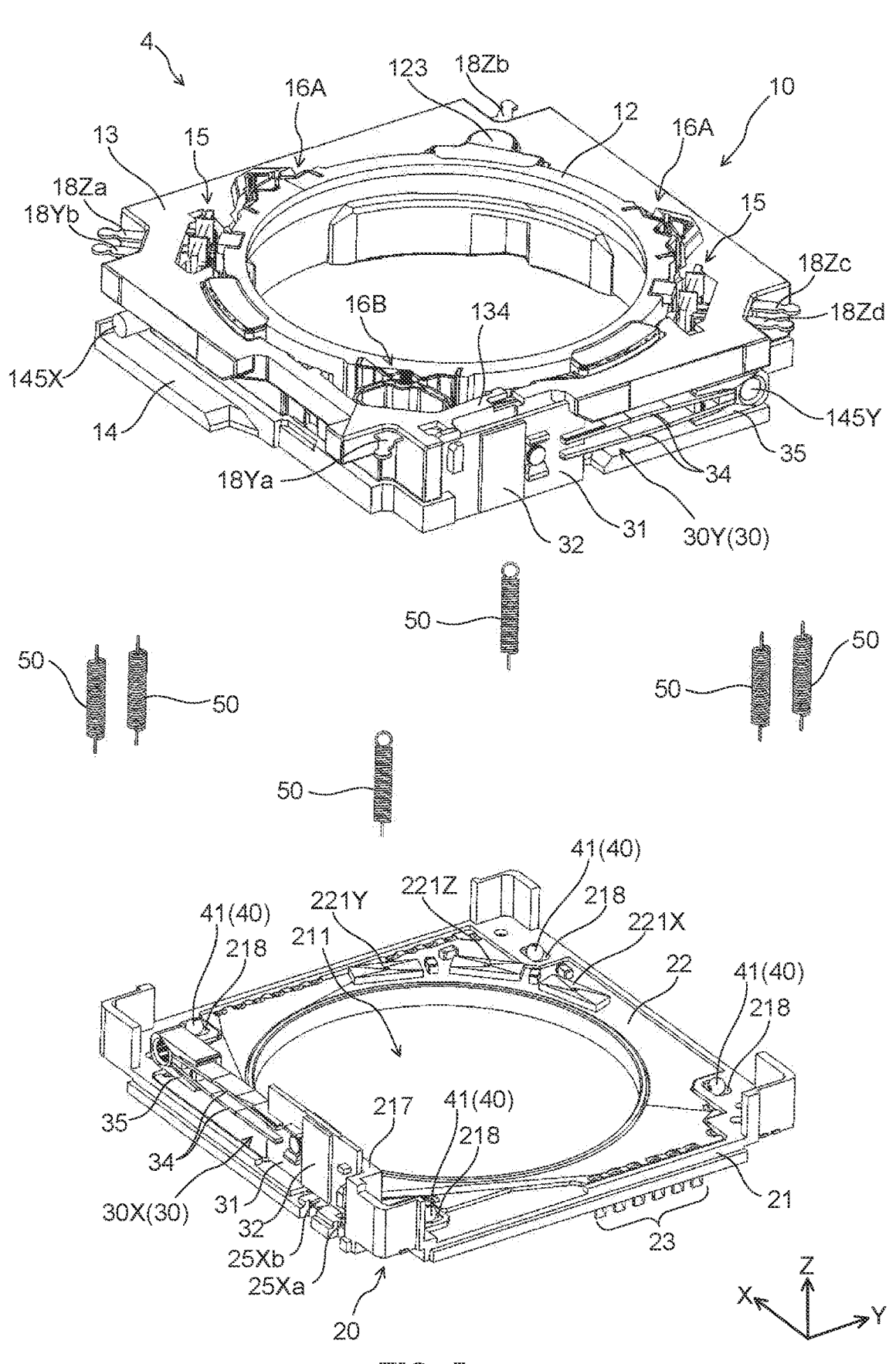
FIG. 5 is an exploded perspective view of the optical element driving device body illustrated in FIGS. 3 and 4.
Figure 6:
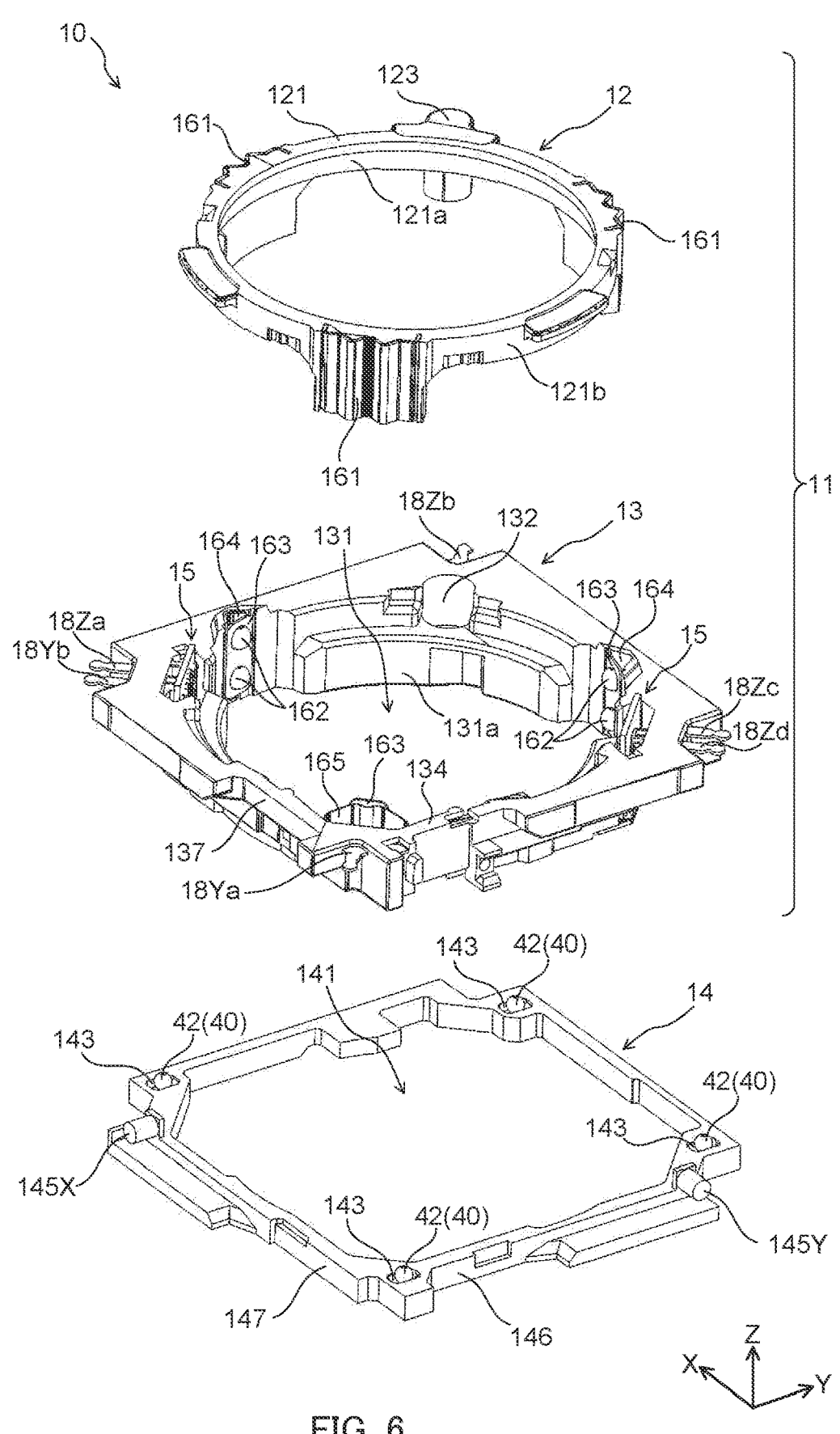
FIG. 6 is an exploded perspective view of an OIS movable part illustrated in FIG. 5.
Figure 7:
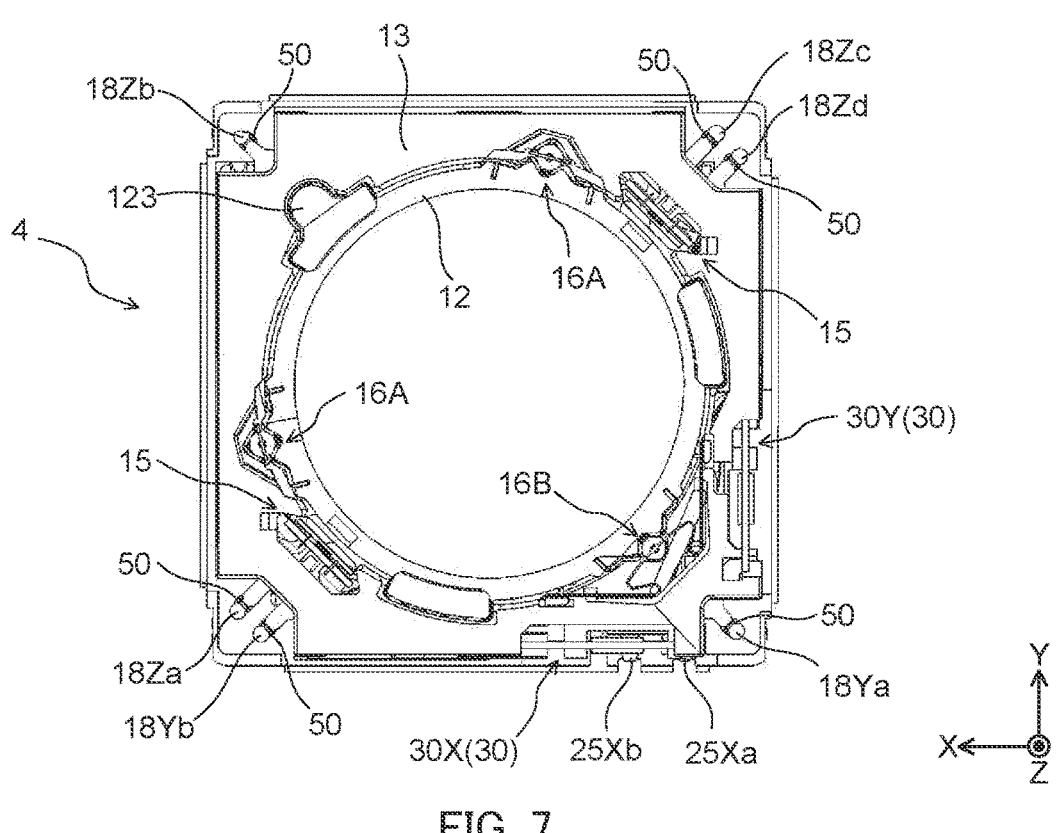
FIG. 7 is a plan view of the optical element driving device body illustrated in FIGS. 3 and 4.

FIG. 5 is an exploded perspective view of optical element driving device body 4. FIG. 6 is an exploded perspective view of OIS movable part 10. FIG. 7 is a plan view of optical element driving device body 4. Optical element driving device body 4 is described below also with reference to FIGS. 5 to 7.

As illustrated in FIG. 5, optical element driving device body 4 includes OIS movable part 10, OIS fixing part 20, OIS driving part 30, OIS supporting part 40 and OIS biasing member 50.

OIS movable part 10 is a part that can hold lens part 2, and sways in the optical axis orthogonal plane during the shake correction. As elaborated later, OIS movable part 10 includes AF part 11, second stage 14 and OIS supporting part 40 (Y-directional reference ball 42) (see FIG. 6). Likewise, as elaborated later, AF part 11 includes AF movable part 12, first stage 13, AF driving part 15 and AF supporting parts 16A and 16B (see FIGS. 5 and 6).

As illustrated in FIG. 5, OIS fixing part 20 includes base 21, and OIS supporting part 40 (X-directional reference ball 41). OIS fixing part 20 is a part disposed at a position separated from OIS movable part 10 in the optical axis direction through OIS supporting part 40, and configured to support OIS movable part 10 in a swayable manner in the optical axis orthogonal direction by means of OIS supporting part 40. In other words, OIS movable part 10 is separated from base 21 in the optical axis direction through X-directional reference ball 41, and base 21 supports OIS movable part 10 in a swayable manner through X-directional reference ball 41.

In addition, OIS movable part 10 and OIS fixing part 20 are elasticity connected by OIS biasing member 50 so as to be biased in a mutually approaching direction, i.e., so as to maintain the state of sandwiching the OIS supporting part 40 (see FIGS. 3 to 5). OIS biasing member 50 is composed of a conductive material. As elaborated later, OIS biasing member 50 functions also as a connecting member that forms a conductive path between a circuit for driving lens part 2 and the like and a circuit on OIS fixing part 20 side. In the embodiment, OIS biasing member 50 is disposed at the four corners (corner portions) of optical element driving device body 4 in plan view (see FIGS. 3 and 4).

As elaborated later, OIS driving part 30 includes first OIS driving part 30X that drives OIS movable part 10 in the X direction, and second OIS driving part 30Y that drives OIS movable part 10 in the Y direction.

In the embodiment, for the movement in the X direction, the entirety of OIS movable part 10 including AF part 11 moves as a movable member. That is, for the movement in the X direction, base 21 of OIS fixing part 20 makes up a fixing body, and X-directional reference ball 41 functions as OIS supporting part 40 that supports OIS movable part 10 in a swayable manner in the X direction.

On the other hand, as elaborated later with reference to FIG. 6, for the movement in the Y direction, AF part 11 moves as a movable member. That is, for the movement in the Y direction, second stage 14 makes up a fixing body together with base 21, and Y-directional reference ball 42 functions as OIS supporting part 40 that supports AF part 11 in a swayable manner in the Y direction.

OIS Fixing Part

Figure 9:
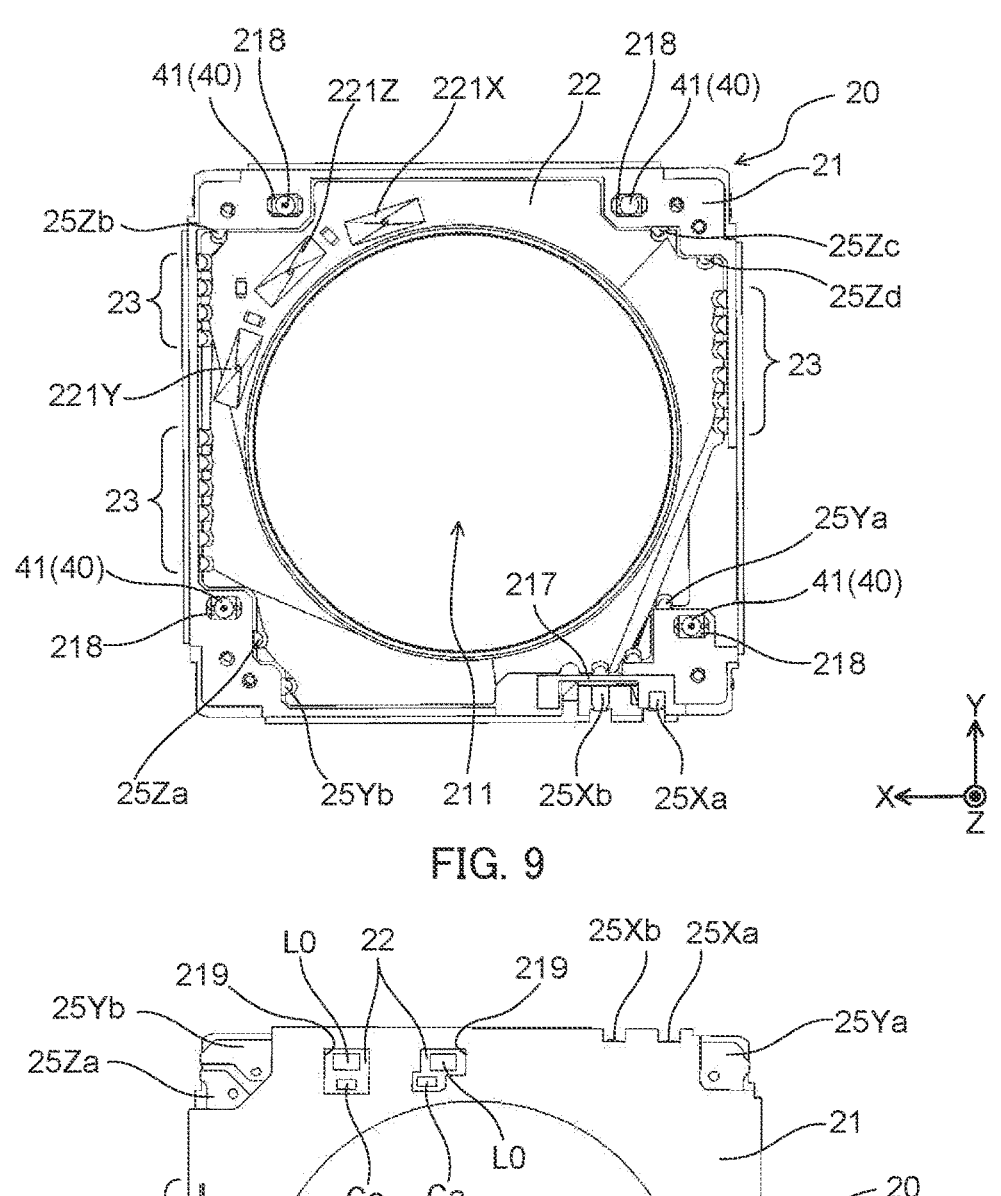
FIG. 9 is a plan view of the OIS fixing part.
Figure 10:
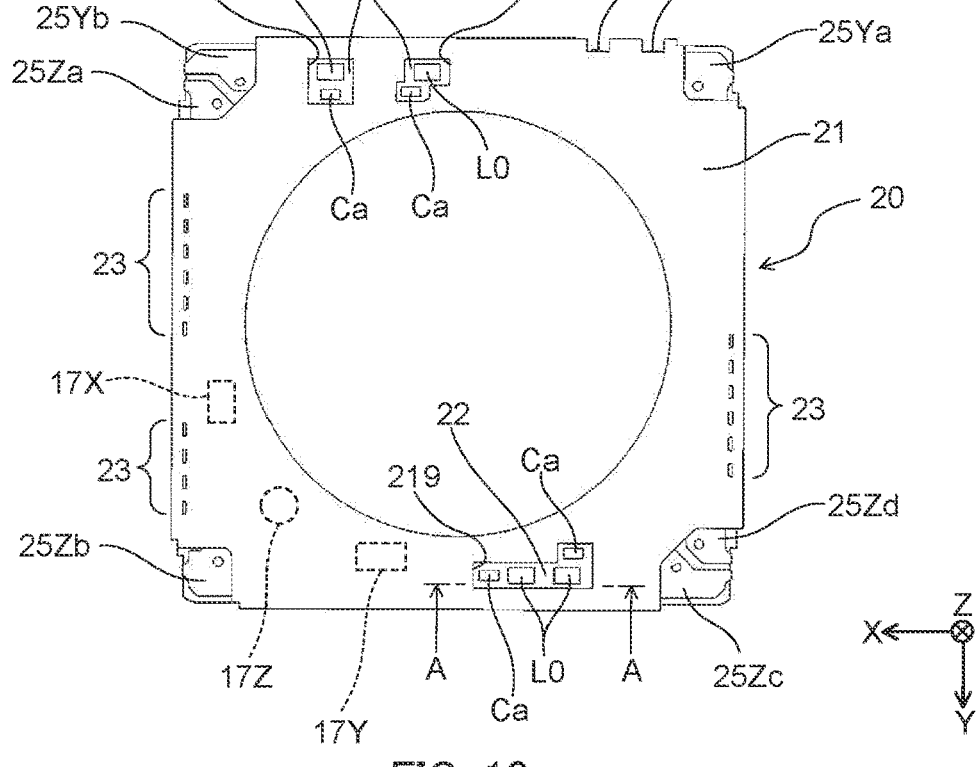
FIG. 10 is a bottom view of the OIS fixing part.

FIG. 9 is a plan view of OIS fixing part 20. In addition, FIG. 10 is a bottom view of OIS fixing part 20. OIS fixing part 20 is described below also with reference to FIGS. 9 and 10.

OIS fixing part 20 includes base 21, substrate 22, first OIS driving part 30X, and OIS supporting part 40 (X-directional reference ball 41) (see FIG. 5).

Base and OIS Supporting Part

Base 21 is composed of a shaping material composed of polyarylate (PAR), PAR alloy (for example, PAR/PC) composed of a mixture of a plurality of resin materials containing PAR, or liquid crystal polymer. Base 21 is a member with a rectangular shape in plan view, with circular opening 211 at the center.

Base 21 includes OIS motor fixing part 217 where first OIS driving part 30X is disposed. OIS motor fixing part 217, with a shape capable of holding first OIS driving part 30X, is disposed near one corner of base 21, and protruded from base 21 toward the optical axis direction light reception side (see FIG. 5) for example.

In addition, base 21 includes the X-directional reference ball holding part 218 that holds X-directional reference ball 41 making up OIS supporting part 40. X-directional reference ball 41 is sandwiched between the X-directional reference ball holding part 218 and the X-directional reference ball holding part 144 of second stage 14 opposite to each other in the Z direction (described later see FIG. 12).

The X-directional reference ball holding part 218 and the X-directional reference ball holding part 144 are recesses with a rectangular opening extending in the X direction. The X-directional reference ball holding part 218 and the X-directional reference ball holding part 144 are formed such that the width of the groove decreases toward the bottom surface of the recess, and for example, they are formed with a substantially v-shaped (tapered shaped) cross-sectional shape, or a substantially U-shaped cross-sectional shape.

The groove of the recess with the above-described cross-sectional shape is formed in parallel to the X direction, and thus X-directional reference ball 41 sandwiched between the X-directional reference ball holding part 218 and the X-directional reference ball holding part 144 can roll in the X direction in the recess. That is, base 21 supports OIS movable part 10 (second stage 14) in a movable manner in the X direction through X-directional reference ball 41.

The X-directional reference ball holding part 218 and the X-directional reference ball holding part 144 are disposed at the portions of the four corners of rectangular base 21 and second stage 14, and OIS movable part 10 (second stage 14) is supported by base 21 at four X-directional reference balls 41, i.e., four points. In this manner, X-directional reference ball 41 stably rolls in the Y direction because it is sandwiched by multi-point contact.

Note that OIS movable part 10 (second stage 14) needs only to be supported by base 21 at least at three or more points. For example, in the case where it is supported at three-points, it suffices to dispose the X-directional reference ball holding part 218 and the X-directional reference ball holding part 144 at a total of three locations of two locations on one edge side and one location on the side opposite to the edge of base 21 and second stage 14.

A plurality of terminals 23 and feeding wirings 25Xa, 25Xb, 25Ya, 25Yb, 25Za, 25Zb, 25Zc and 25Zd are disposed at the outer edges of base 21 (see FIGS. 9 and 10).

Terminal 23 is embedded in base 21 by, for example, insert molding, and formed such that one end of each terminal is exposed from the top surface of base 21 (see FIG. 9), and the other end is exposed from the bottom surface of base 21 (see FIG. 10). Terminal 23 is a terminal for power-feeding and signals to driver ICs 221X, 221Y and 221Z described later for driving first OIS driving part 30X, second OIS driving part 30Y, and AF driving part 15.

In addition, feeding wirings 25Xa and 25Xb are exposed at the top surface of base 21 from the inner end portion to the outer end portion at the outer edges of base 21 (see FIG. 9). In addition, feeding wirings 25Ya and 25Yb are formed such that the inner end portion is exposed at the top surface of base 21 (see FIG. 9) and the outer end is exposed at the bottom surface of base 21 at the corners as the outer edges of base 21 (see FIG. 10). In addition, feeding wirings 25Za, 25Zb, 25Zc and 25Zd are formed such that the inner end portion is exposed at the top surface of base 21 (see FIG. 9), and the outer end is exposed at the bottom surface of base 21 at the corners as the outer edges of base 21 (see FIG. 10).

The inner end portions of feeding wirings 25Xa and 25Xb are connected to substrate 22, and connected to driver IC 221X through boost part 60 described later. The outer end portions of feeding wirings 25Xa and 25Xb are connected to first OIS driving part 30X. In addition, the inner end portions of feeding wirings 25Ya and 25Yb are connected to substrate 22, and connected to driver IC 221Y through boost part 60 described later. The outer end portions of feeding wirings 25Ya and 25Yb are connected to second OIS driving part 30Y through OIS biasing member 50 and feeding wirings 18Ya and 18Yb. In addition, the inner end portions of feeding wirings 25Za, 25Zb, 25Zc and 25Zd are connected to substrate 22, and connected to driver IC 221Z through boost part 60 described later. The outer end portions of feeding wirings 25Za, 25Zb, 25Zc and 25Zd are connected to two AF driving parts 15 through OIS biasing member 50 and feeding wirings 18Za, 18Zb, 18Zc and 18Zd.

Here, as an example, driver IC 221X is a 1-channel driver IC that controls the driving of one driving part, and driver IC 221Y is also the same 1-channel driver IC. In addition, driver IC 221Z is a 2-channel driver IC that controls the driving of two driving parts. The number of channels in driver ICs 221X, 221Y and 221Z can be changed as necessary in accordance with the number of driving parts to be driven.

Substrate

Figures 11, 12:
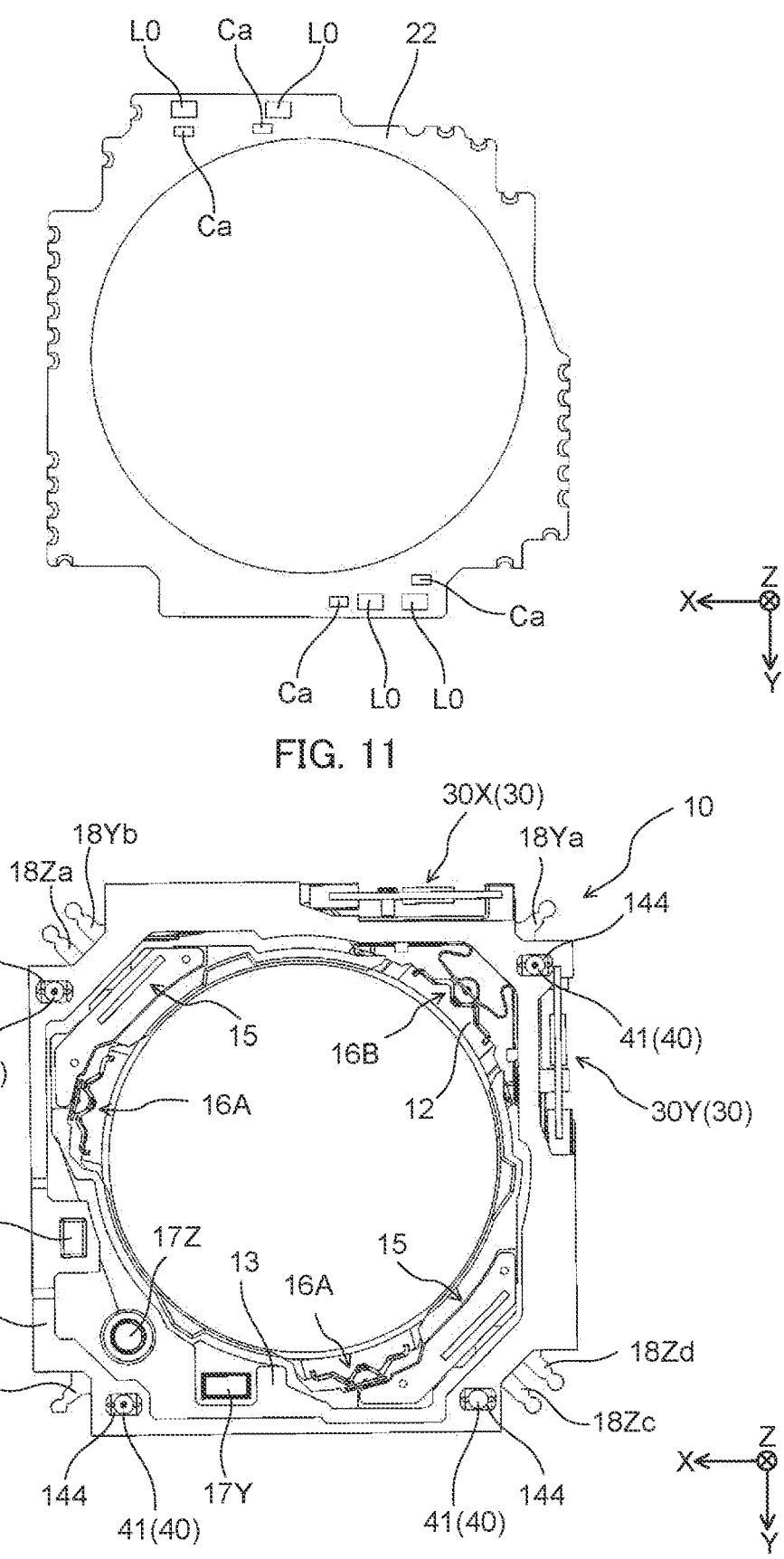
FIG. 11 is a bottom view of a substrate.
FIG. 12 is a bottom view of the OIS movable part.

FIG. 11 is a bottom view of substrate 22. Substrate 22 is described below also with reference to FIG. 11.

Substrate 22 is disposed on the optical axis direction light reception side of base 21. Substrate 22 is electrically connected to terminal 23 exposed at the top surface of base 21, and terminal 23 is connected to driver ICs 221X, 221Y and 221Z and the like through the wiring (omitted in the drawing) formed in substrate 22. In addition, driver ICs 221X, 221Y and 221Z are connected to feeding wirings 25Xa, 25Xb, 25Ya, 25Yb, 25Za, 25Zb, 25Zc and 25Zd through the wiring (omitted in the drawing) formed in substrate 22. As described above, feeding wirings 25Xa, 25Xb, 25Ya, 25Yb, 25Za, 25Zb, 25Zc and 25Zd are connected to first OIS driving part 30X, second OIS driving part 30Y, and AF driving part 15.

Driver ICs 221X, 221Y and 221Z, each of which includes a magnetic sensor (omitted in the drawing), are disposed on the optical axis direction light reception side of substrate 22. These magnetic sensors are composed of a Hall element, a TMR (Tunnel Magneto Resistance) sensor or the like, and magnetically detect the positions of the detection object in the X, Y, and Z directions by detecting the magnetic field generated by magnets 17X, 17Y and 17Z described later, for example.

In substrate 22, driver ICs 221X, 221Y and 221Z are provided in a region where AF driving part 15, AF supporting parts 16A and 16B, first OIS driving part 30X and second OIS driving part 30Y are not disposed (see FIG. 5). That is, they are provided in a region near one corner in rectangular base 21 in plan view (see FIG. 9). In this manner, the space inside optical element driving device body 4 can be effectively utilized by collectively disposing driver ICs 221X, 221Y and 221Z in one region.

As illustrated in FIG. 12 described later, magnet 17X is disposed on the bottom surface side of second stage 14 that moves in the X direction, and driver IC 221X and magnet 17X are disposed to face each other. The X direction position detection part composed of driver IC 221X and magnet 17X detects the position of second stage 14 in the X direction, i.e., the position of OIS movable part 10 in the X direction.

In addition, as illustrated in FIG. 12, magnet 17Y is disposed on the bottom surface side of first stage 13 that moves in the Y direction, and driver IC 221Y and magnet 17Y are disposed to face each other. The Y direction position detection part composed of driver IC 221Y and magnet 17Y detects the position of first stage 13 in the Y direction, i.e., the position of OIS movable part 10 in the Y direction.

In addition, as illustrated in FIG. 12, magnet 17Z is disposed on the bottom surface side of AF movable part 12 that moves in the Z direction, and driver IC 221Z and magnet 17Z are disposed to face each other. The Z direction position detection part composed of driver IC 221Z and magnet 17Z detects the position of AF movable part 12 in the Z direction.

Note that the position detection may be performed by other methods than the combination of the above-described magnets 17X, 17Y and 17Z and the magnetic sensors of driver ICs 221X, 221Y and 221Z. For example, the position of OIS movable part 10 in the X direction and Y direction and the position of AF movable part 12 in the Z direction may be detected by an optical sensor such as a photo reflector.

Driving Circuit

In optical element driving device 1, an ultrasound motor including a piezoelectric element is used as AF driving part 15, first OIS driving part 30X and second OIS driving part 30Y in view of achieving size reduction and the like. A relatively large driving voltage is required for driving an ultrasound motor, but a large-sized inductor is required for boosting the input voltage to the desired voltage and the use of a large-sized inductor may hinder the size reduction of optical element driving device 1. On the other hand, in the case where a small-sized inductor is used, the electrical characteristics, e.g., frequencies are changed from desired resonance frequency values, which may affect the controllability of the ultrasound motor.

Figure 15:
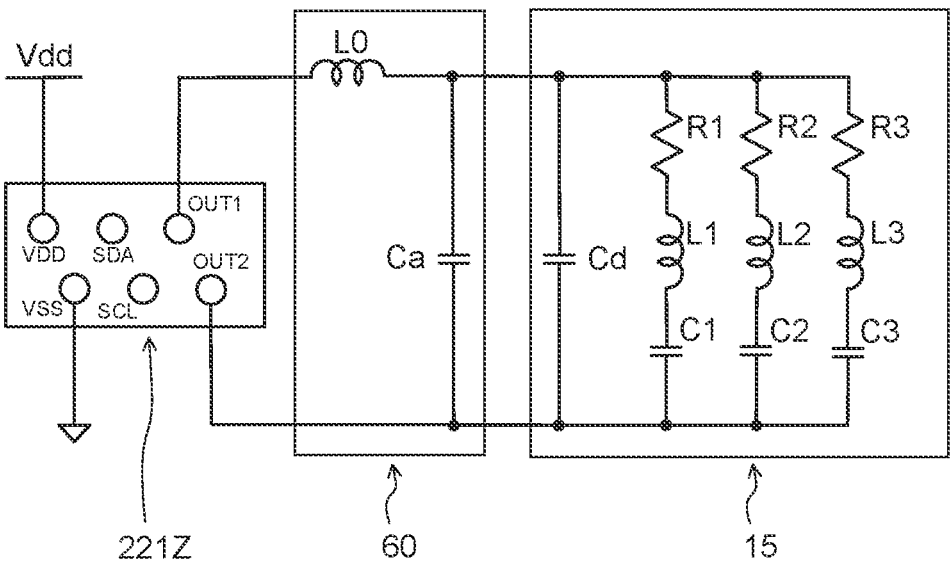
FIG. 15 is a circuit diagram illustrating a driving circuit including an inductor and a capacitor according to the embodiment of the present invention.

In view of this, this embodiment has a driving circuit configuration in which boost part 60 including inductor L0 and capacitor Ca is connected between driver IC 221Z and AF driving part 15 as illustrated in FIG. 15. FIG. 15 is a circuit diagram illustrating the driving circuit of the embodiment including inductor L0 and capacitor Ca.

Driver IC 221Z in FIG. 15 and FIG. 16 described later is briefly described below. Driver IC 221Z includes a Hall element serving as a magnetic sensor. Terminal VDD is a terminal for inputting input voltage Vdd from the input power source. Terminal VDD provides input voltage Vdd to the Hall element, and supplies the driving voltage during the driving of AF driving part 15. Terminal VSS is connected to the ground of the driving circuit. Terminal SDA is a terminal for inputting and outputting a digital data signal. Terminal SCL is a terminal for inputting a clock digital signal. Terminals OUT1 and OUT2 are terminals for outputting the driving current required for driving AF driving part 15. In the driving circuit illustrated in FIG. 15, the voltage from terminals OUT1 and OUT2 is boosted at boost part 60 and supplied to AF driving part 15 to drive AF driving part 15 and perform auto focus.

Figure 16:
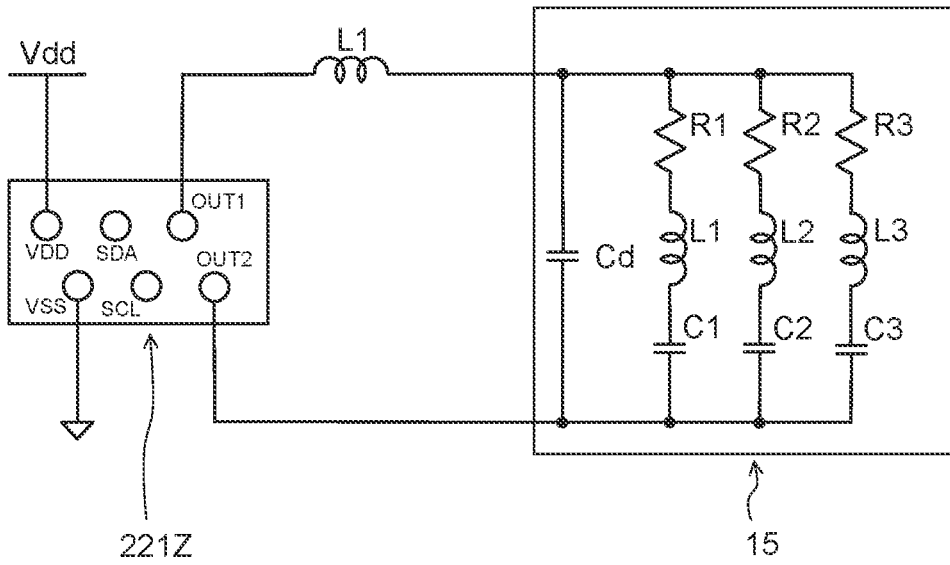
FIG. 16 is a circuit diagram illustrating a driving circuit including an inductor of a comparative example.

In addition, in FIGS. 15 and 16, the circuit illustrated as AF driving part 15 is an equivalent circuit of AF driving part 15, and includes resistors R1 to R3, inductors L1 to L3, and capacitors C1 to C3 and Cd.

In boost part 60, inductor L0 is connected in series to AF driving part 15, and capacitor Ca is connected in parallel to AF driving part 15. With such a configuration of boost part 60, the inductance of inductor L0 can be reduced in comparison with the comparative example illustrated in FIG. 16 without changing the electrical characteristics, i.e., without changing the boost voltage and the frequency characteristics for the voltage from terminals OUT1 and OUT2.

FIG. 16 is a circuit diagram illustrating a driving circuit including inductor L1 of a comparative example. In the driving circuit illustrated in FIG. 16, the inductance of inductor L1 is selected so as to set the same electrical characteristics as those of the driving circuit illustrated in FIG. 15.

In the driving circuit illustrated in FIGS. 15 and 16, the combination of the inductance and capacitance in the driving circuit sets the electrical characteristics. In the driving circuit illustrated in FIG. 16, it is necessary to increase the inductance of inductor L1 to obtain the desired boost voltage for AF driving part 15. In general, an inductor is a coil element, in which the larger the cross-sectional area, the greater the inductance, and further, the greater the number of turns, the greater the inductance. That is, the greater the inductance, the greater the inductor size, whereas the smaller the inductance, the smaller the inductor size. In this manner, in the driving circuit illustrated in FIG. 16, the size of inductor L1 is large because the inductance of inductor L1 is large. If the size of inductor L1 is small in the driving circuit illustrated in FIG. 16, the inductance of inductor L1 is small, and the electrical characteristics, especially the frequency characteristics (frequency band) change, thus affecting the control of AF driving part 15.

The driving circuit of the embodiment illustrated in FIG. 15 uses boost part 60 including capacitor Ca and inductor L0 with a smaller inductance than inductor L1. In the driving circuit illustrated in FIG. 15, with the combination of the capacitance and the inductance contributed by inductor L0 and capacitor Ca, electrical characteristics equivalent to the driving circuit illustrated in FIG. 16 using inductor L1 with a larger inductance than inductor L0 can be obtained. That is, in the driving circuit illustrated in FIG. 15, the desired frequency characteristics (frequency band) can be obtained by using also capacitor Ca even with inductor L0 with a smaller inductance than inductor L1. In other words, in the driving circuit illustrated in FIG. 15, the inductance of inductor L0 can be smaller than of inductor L1 by using also capacitor Ca, and thus the size of inductor L0 can be reduced. In this manner, the size of inductor L0 can be reduced, and thus size reduction of optical element driving device 1 can be achieved.

Note that FIGS. 15 and 16 illustrate a driving circuit including driver IC 221Z and AF driving part 15 as an example. In the embodiment, also at the driving circuit including driver IC 221X and first OIS driving part 30X and the driving circuit including driver IC 221Y and second OIS driving part 30Y, the above-described boost part 60 is connected as in the driving circuit illustrated in FIG. 15.

In the embodiment, four pairs of inductors L0 and capacitors Ca are required because optical element driving device 1 includes two AF driving parts 15, first OIS driving part 30X and second OIS driving part 30Y. Even when the number of inductors L0 is large as in this case, inductor L0 can be provided at substrate 22 together with capacitor Ca because the size of inductor L0 is not large as described above (see FIGS. 10 and 11). That is, a plurality of pairs of inductors L0 and capacitors Ca can be disposed inside optical element driving device 1.

In addition, inductor L0 has a high degree of freedom of arrangement in substrate 22 because the size of inductor L0 is not large. Thus, inductor L0 and capacitor Ca can be disposed inside optical element driving device 1 without enlarging optical element driving device 1.

Because of the magnetic performance of inductor L0, a magnetic flux flowing through magnets 17X, 17Y and 17Z may affect the detection of the magnetic sensors of driver ICs 221X, 221Y and 221Z, for example. However, the range of the influence of the magnetic flux is small because the size of inductor L0 is not large as described above, and thus the influence of inductor L0 can be suppressed. As a result, the influence on the detection of the magnetic sensor can be suppressed.

In addition, since inductor L0 has a high degree of freedom of arrangement at substrate 22 as described above, inductor L0 can be disposed at positions separated from magnets 17X, 17Y and 17Z and driver ICs 221X, 221Y and 221Z in the embodiment. With such an arrangement, the magnetic influence of inductor L0 can be suppressed.

For example, in FIG. 10, regarding magnets 17X, 17Y and 17Z disposed on the optical axis direction light reception side of base 21, magnets 17X, 17Y and 17Z are disposed on the left lower side in the drawing. Inductor L0 is disposed at positions separated from magnets 17X, 17Y and 17Z where it does not face at least magnets 17X, 17Y and 17Z. With such an arrangement, the distance between inductor L0 and magnets 17X, 17Y and 17Z (the distance in the X and Y directions) can be ensured, the magnetic influence from inductor L0 can be suppressed. As a result, the influence on the detection of the magnetic sensor can be suppressed.

In addition, as illustrated in FIG. 11, inductor L0 is disposed at substrate 22 on the bottom surface side where it does not face magnets 17X, 17Y and 17Z. In this case, as illustrated in FIG. 10, opening 219 extending through base 21 is provided such that inductor L0 provided on the bottom surface side of substrate 22 is located inside opening 219 when substrate 22 is disposed at the top surface of base 21. In addition, in this case, in consideration of the ease of manufacture, capacitor Ca is provided on the bottom surface side of substrate 22 together with inductor L0 such that capacitor Ca is also located inside opening 219. With this configuration, it is not necessary to ensure the installation space of inductor L0 provided on the bottom surface side of substrate 22, and thus the height of optical element driving device 1 can be reduced.

Figure 17:
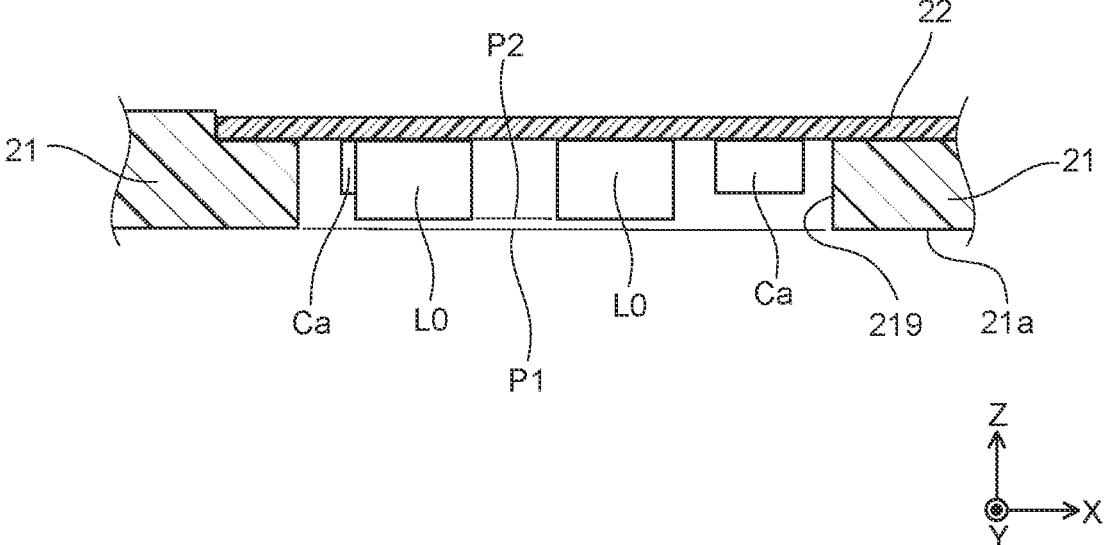
FIG. 17 is a sectional view of the OIS fixing part illustrated in FIG. 10 taken along line A-A.

FIG. 17 is a sectional view taken along line A-A of FIG. 10. Desirably, position P2 below inductor L0 disposed inside opening 219 of base 21 is not located on the lower side than position P1 of bottom surface 21a of base 21. For example, the size of inductor L0 is set such that in the Z direction, position P2 is at the same position as position P1 or a position on the light reception side than position P1 in the optical axis direction. In addition, in the case where there is no influence on the height reduction of optical element driving device 1, position P2 may be set so as not to be located on the lower side than position P1 by adjusting the position of substrate 22 with respect to base 21 in the optical axis direction light reception side. For example, position P2 may be set so as not to be located on the lower side than position P1 by providing a protruding part at the top surface side of base 21 to place substrate 22 on the protruding part, and/or by providing a spacer interposed between the top surface of base 21 and substrate 22.

In this manner, with inductor L0 disposed on the bottom surface side of substrate 22, the distance (the Z direction distance) between inductor L0 and magnets 17X, 17Y and 17Z can be ensured, and the magnetic influence from inductor L0 can be suppressed. As a result, the influence on the detection of the magnetic sensor can be suppressed.

Note that it is conceivable to adopt a configuration in which an inductor is disposed separately from the optical element driving device in the camera-mounted device including the optical element driving device. In such a configuration, when there is a variation (shift from the designed value) in the characteristics of the inductor, the user using the optical element driving device has to perform adjustment operation, which is burdensome for the user, and leads to poor usability.

Conversely, in the embodiment, even when adjustment is required due to variation in the characteristics of inductor L0, the adjustment can be implemented before product shipment of optical element driving device 1 because inductor L0 is provided inside optical element driving device 1. In this manner, the user using optical element driving device 1 does not need to perform the adjustment, and the user-friendliness of the user can be improved. In addition, as described above, in the embodiment, driver ICs 221X, 221Y and 221Z are also provided inside optical element driving device 1. Therefore, it is not necessary to prepare driver ICs 221X, 221Y and 221Z separately from optical element driving device 1, which also contributes to improvement of the user-friendliness of the user.

OIS Driving Part

OIS driving part 30 is an actuator that moves OIS movable part 10 in the X direction and the Y direction. More specifically, OIS driving part 30 includes first OIS driving part 30X that moves the entire OIS movable part 10 in the X direction, and second OIS driving part 30Y that moves a part (AF part 11) of OIS movable part 10 in the Y direction.

While first OIS driving part 30X and second OIS driving part 30Y are different in arrangement direction, they have the same components, and therefore the same components are denoted with the same reference numerals and described with reference to FIG. 5.

First OIS driving part 30X and second OIS driving part 30Y include an ultrasound motor serving as a driving source for moving OIS movable part 10. First OIS driving part 30X is fixed to OIS motor fixing part 217 along the X direction of base 21. In addition, second OIS driving part 30Y is fixed to OIS motor fixing part 134 along the Y direction of first stage 13. That is, first OIS driving part 30X and second OIS driving part 30Y are disposed along respective edges (side surfaces) orthogonal to each other at OIS movable part 10.

First OIS driving part 30X and second OIS driving part 30Y include OIS resonance part 31 serving as a resonance part, OIS piezoelectric element 32 serving as a piezoelectric element and OIS power transmission part 34 serving as a power transmission. The driving force of OIS driving part 30 is transmitted to other members through OIS power transmission part 34. More specifically, first OIS driving part 30X is connected to second stage 14 to transmit its driving force, through OIS power transmission part 34. In addition, second OIS driving part 30Y is connected to second stage 14 to transmit its driving force, through OIS power transmission part 34. In OIS driving part 30, OIS resonance part 31 makes up an active element, and OIS power transmission part 34 makes up a passive element.

OIS resonance part 31 is formed of a conductive material, and is sandwiched by OIS piezoelectric element 32 described later to resonate with the vibration of OIS piezoelectric element 32 and convert the vibration motion to a linear movement. OIS resonance part 31 is formed by laser processing, etching, pressing or the like of a metal plate, for example.

OIS resonance part 31 of first OIS driving part 30X is fixed to OIS motor fixing part 217 (base 21 side) by rivets, adhesive or the like, for example. OIS resonance part 31 of second OIS driving part 30Y is fixed to OIS motor fixing part 134 (first stage 13 side) by rivets, adhesive or the like, for example.

OIS piezoelectric element 32 is a plate-shaped element formed of a ceramic material, and generates vibration by applying a high frequency voltage, for example. Two OIS piezoelectric elements 32 are bonded to each other so as to sandwich OIS resonance part 31.

OIS piezoelectric element 32 of first OIS driving part 30X is electrically connected to the above-described feeding wirings 25Xa and 25Xb by an electrode member (omitted in the drawing) or the like, for example. OIS piezoelectric element 32 of second OIS driving part 30Y is electrically connected to the above-described feeding wirings 18Ya and 18Yb by an electrode member (omitted in the drawing) or the like, for example. This connection can apply a voltage to OIS piezoelectric element 32, and vibration is generated at OIS piezoelectric element 32 through the application of the voltage.

The above-described OIS resonance part 31 has at least two resonance frequencies, and deforms in different behaviors for respective resonance frequencies. In other words, OIS resonance part 31 is configured to deform in different behaviors for two resonance frequencies. The different behaviors are behaviors of moving OIS power transmission part 34 forward and backward in the X direction or the Y direction. Thus, by vibrating OIS piezoelectric element 32 at the desired resonance frequency, OIS power transmission part 34 can be moved forward or backward in the X direction or the Y direction.

OIS power transmission part 34 is a chucking guide extending in the X direction or the Y direction, and its one end is in contact with OIS resonance part 31 to transmit the driving force from OIS resonance part 31. Stage fixing part 35 serving as the other end of OIS power transmission part 34 is connected to second stage 14. More specifically, stage fixing part 35 of first OIS driving part 30X is fixed to OIS chucking guide fixing part 145X of second stage 14. In addition, stage fixing part 35 of second OIS driving part 30Y is fixed to OIS chucking guide fixing part 145Y of second stage 14.

As described above, second OIS driving part 30Y is fixed to first stage 13 (OIS movable part 10 side) through OIS motor fixing part 134, and connected to second stage 14 through OIS power transmission part 34. Second OIS driving part 30Y is driven during the shake correction in the Y direction, such that first stage 13 moves in the Y direction with respect to second stage 14. Note that second OIS driving part 30Y moves together with first stage 13 (OIS movable part 10) during the shake correction of first OIS driving part 30X in the X direction.

In addition, first OIS driving part 30X is fixed to base 21 (OIS fixing part 20 side) through OIS motor fixing part 217, and connected to second stage 14 through OIS power transmission part 34. First OIS driving part 30X is driven during the shake correction in the X direction, such that second stage 14 moves in the X direction with respect to base 21 (OIS fixing part 20). First OIS driving part 30X drives second stage 14 in the X direction with respect to base 21 (OIS fixing part 20), and is not influenced by the shake correction of second OIS driving part 30Y in the Y direction.

That is, the movement of one OIS driving part 30 is not hindered by the structure of the other OIS driving part 30. Thus, the rotation of OIS movable part 10 around the Z axis can be prevented, and OIS movable part 10 can be accurately swayed in the XY plane.

OIS Supporting Part

OIS supporting part 40 supports OIS movable part 10 separated from OIS fixing part 20 in the optical axis direction in a swayable manner in the optical axis orthogonal direction. In the embodiment, OIS supporting part 40 includes four X-directional reference balls 41 interposed between OIS movable part 10 (second stage 14) and base 21 (see FIG. 5). In addition, OIS supporting part 40 includes four Y-directional reference balls 42 interposed between first stage 13 and second stage 14 at OIS movable part 10 (see FIG. 6).

In the embodiment, as described above, four X-directional reference balls 41 can roll in the X direction, and the rollable direction is regulated in the X direction. In addition, as described later, four Y-directional reference balls 42 can roll in the Y direction, and the rollable direction is regulated in the Y direction. By regulating the rollable direction of X-directional reference ball 41 and Y-directional reference ball 42 in this manner, OIS movable part 10 can accurately sway in the XY plane. Note that the number of X-directional reference balls 41 and Y-directional reference balls 42 making up OIS supporting part 40 can be changed as necessary.

OIS Biasing Member

OIS biasing members 50 are disposed at the portions of the four corners (corner portions) of rectangular OIS movable part 10 and OIS fixing part 20. OIS biasing member 50 is composed of a tensile coil spring, and couples OIS movable part 10 and OIS fixing part 20, for example.

The end portion of OIS biasing member 50 on the optical axis direction imaging side is connected to feeding wirings 25Ya and 25Yb, 25Za, 25Zb, 25Zc, 25Zd exposed from the corner of the bottom surface of base 21 (see FIG. 10). On the other hand, the end portion on the optical axis direction light reception side is connected to feeding wirings 18Ya, 18Yb, 18Za, 18Zb, 18Zc and 18Zd of first stage 13 (see FIGS. 3 and 4).

OIS biasing member 50 acts such that OIS movable part 10 and OIS fixing part 20 approach each other by receiving the tensile load of coupling OIS movable part 10 and OIS fixing part 20. Specifically, with OIS biasing member 50, OIS movable part 10 is held in a swayable manner in the XY plane in a state of being biased to the optical axis direction imaging side (a state of being pressed against base 21). In this manner, OIS movable part 10 can be stably held with no backlash. Here, two OIS biasing members 50 are disposed on the radially outside of two AF driving parts 15 so that AF driving part 15 can be stably driven.

In addition, OIS biasing member 50 is composed of a conductive material, and serves as a power feeding line (conductive path) to AF driving part 15 and second OIS driving part 30Y.

In addition, at first stage 13 and second stage 14, OIS biasing member 50 is disposed at notch parts (reference numeral omitted) provided at their four corners (corner portions) (see FIGS. 3 and 4). Since the notch parts are formed in first stage 13 and second stage 14, OIS biasing member 50 can be disposed without enlarging base 21, and thus the increase of the device size can be suppressed, i.e., size reduction of optical element driving device 1 can be achieved.

OIS Movable Part

FIG. 12 is a bottom view of OIS movable part 10. OIS movable part 10 is described below also with reference to FIG. 12.

OIS movable part 10 is configured to be able to hold lens part 2 (see FIG. 2), and includes AF part 11, second stage 14 and the like as illustrated in FIGS. 5 and 6. In addition, AF part 11 includes AF movable part 12, first stage 13, AF driving part 15, AF supporting parts 16A and 16B and the like. For the OIS function, OIS movable part 10 is configured by stacking first stage 13 and second stage 14 on base 21 of OIS fixing part 20.

In addition, OIS movable part 10 is configured to be movable by OIS driving part 30 (first OIS driving part 30X and second OIS driving part 30Y) in the optical axis orthogonal direction together with AF movable part 12. For the movement in the X direction, the entire OIS movable part 10 including first stage 13 and second stage 14 is the movable member. On the other hand, for the movement in the Y direction, second stage 14 functions as a fixing body together with OIS fixing part 20, and AF part 11 (AF movable part 12 and first stage 13) alone functions as the movable member. In addition, first stage 13 functions as an AF fixing part for supporting AF movable part 12.

AF Movable Part

Figure 8:
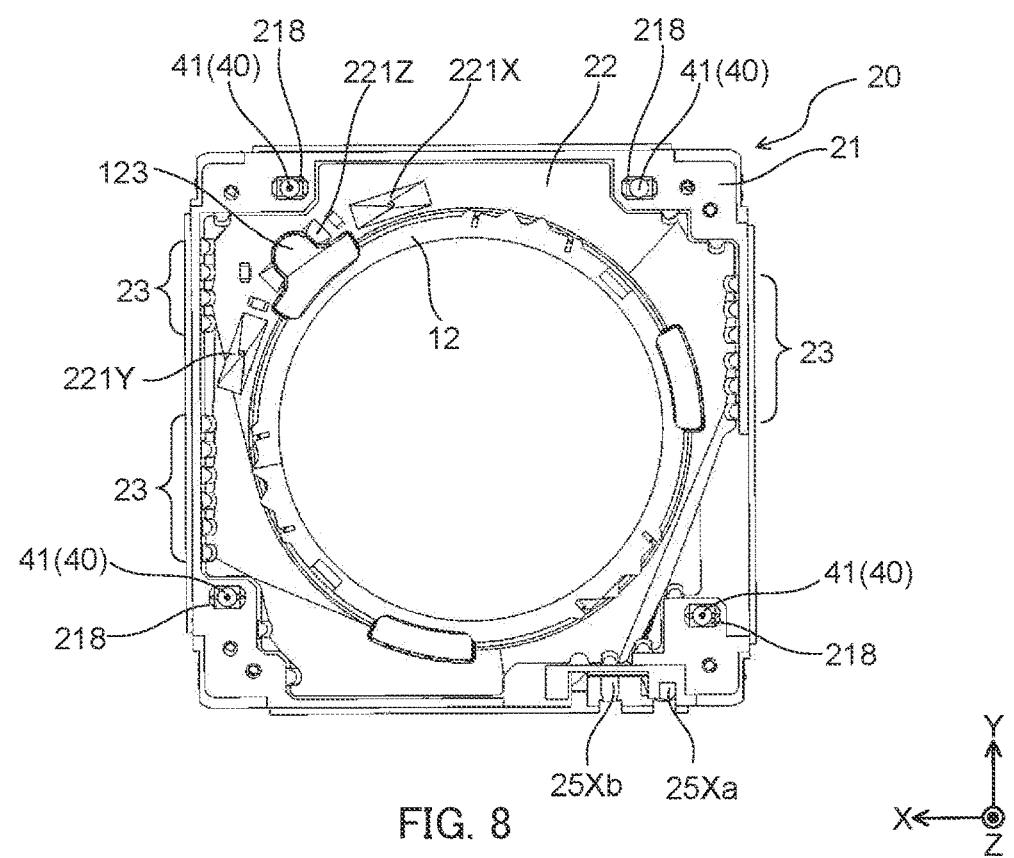
FIG. 8 is a plan view illustrating a positional relationship between an OIS fixing part and an AF movable part.

FIG. 8 is a plan view illustrating a positional relationship between OIS fixing part 20 and AF movable part 12. In addition, FIG. 14 is a bottom view of AF movable part 12. AF movable part 12 is described below also with reference to FIGS. 8 and 13. Note that in FIG. 8, OIS fixing part 20 and AF movable part 12 are illustrated to illustrate the positional relationship between OIS fixing part 20 and AF movable part 12, without illustrating first stage 13 and second stage 14.

AF movable part 12 is a lens holder that can hold lens part 2 (see FIG. 2), and is configured to be movable by AF driving part 15 in the optical axis direction (the Z direction) in a state of holding lens part 2. AF movable part 12 is moved in the optical axis direction at the time of focusing of the AF function, for example. AF movable part 12 is disposed separately from first stage 13 (AF fixing part) on the inside in the radial direction (lens part 2 side), and is supported by first stage 13 through AF supporting parts 16A and 16B (see FIG. 5).

AF movable part 12 is formed of polyarylate (PAR), PAR alloys of mixtures of multiple resin materials including PAR, liquid crystal polymers or the like, for example.

AF movable part 12 includes lens housing part 121 that opens inside in a cylindrical shape. Lens part 2 is fixed by bonding or the like on inner peripheral surface 121a of lens housing part 121, for example.

AF movable part 12 includes protruding part 123 radially outwardly protruding from a part of outer peripheral surface 121b of lens housing part 121, and extending in the optical axis direction imaging side. Z-position detection magnet 17Z is provided inside protruding part 123. As described above, magnet 17Z is disposed at a position facing Z-position driver IC 221Z (magnetic sensor) of substrate 22 in the optical axis direction (see FIG. 8 and the like). Protruding part 123 is inserted to insertion hole 132 of first stage 13 described later to move along insertion hole 132 when AF movable part 12 moves in the Z direction.

In addition, first rail member 161 making up AF supporting parts 16A and 16B is attached to outer peripheral surface 121b of lens housing part 121. Here, as an example, first rail members 161 are attached at three locations in outer peripheral surface 121b of lens housing part 121. AF movable part 12 is supported in a movable manner in the Z direction by AF supporting parts 16A and 16B including first rail member 161 and the like. AF supporting parts 16A and 16B including first rail member 161 are described later.

In addition, lens housing part 121 is connected to AF driving part 15 by the AF connecting member omitted in the drawing. AF movable part 12 is driven to move in the Z direction by AF driving part 15 through the AF connecting member connected to lens housing part 121.

AF Driving Part

AF driving part 15 is an actuator that moves AF movable part 12 in the Z direction. As with OIS driving part 30, AF driving part 15 includes an ultrasound motor serving as a driving source for moving AF movable part 12.

Basically, AF driving part 15 has the same configuration as that of OIS driving part 30 although there are differences in size, shape and the like. AF driving part 15 includes an AF resonance part serving as a resonance part, an AF piezoelectric element serving as a piezoelectric element and an AF power transmission serving as a power transmission. Therefore, for AF driving part 15, illustration of components, and overlapping description will be omitted.

AF driving part 15 is fixed by rivets, adhesive or the like to inner peripheral surface 131a of opening 131 of first stage 13. The driving force of AF driving part 15 fixed to inner peripheral surface 131a is transmitted to AF movable part 12 through the AF power transmission and the AF connecting member. Also in AF driving part 15, the AF resonance part makes up an active element, and the AF power transmission makes up a passive element.

In the embodiment, a pair of AF driving parts 15 is provided. The pair of AF driving parts 15 is disposed at locations different from the locations of AF supporting parts 16A and 16B in inner peripheral surface 131a, and separately disposed at positions facing each other (diagonal positions of OIS movable part 10) (see FIG. 7).

First Stage

Figure 13:
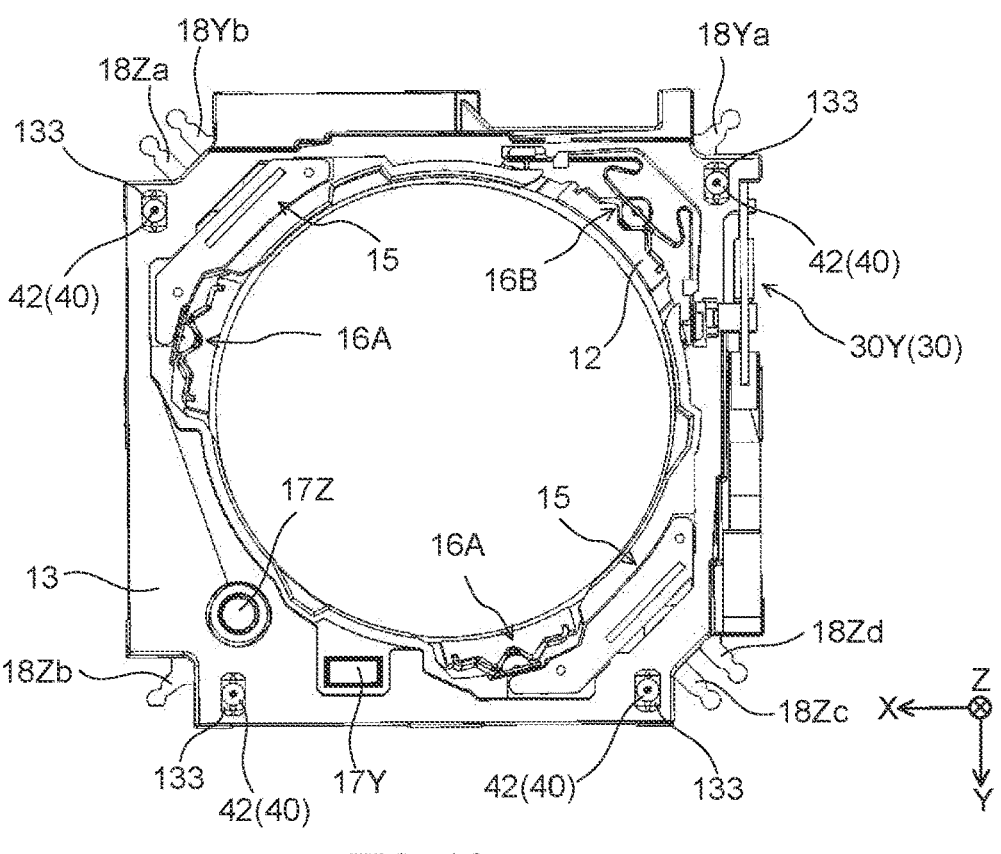
FIG. 13 is a bottom view of the AF movable part and a first stage.
Figure 14:
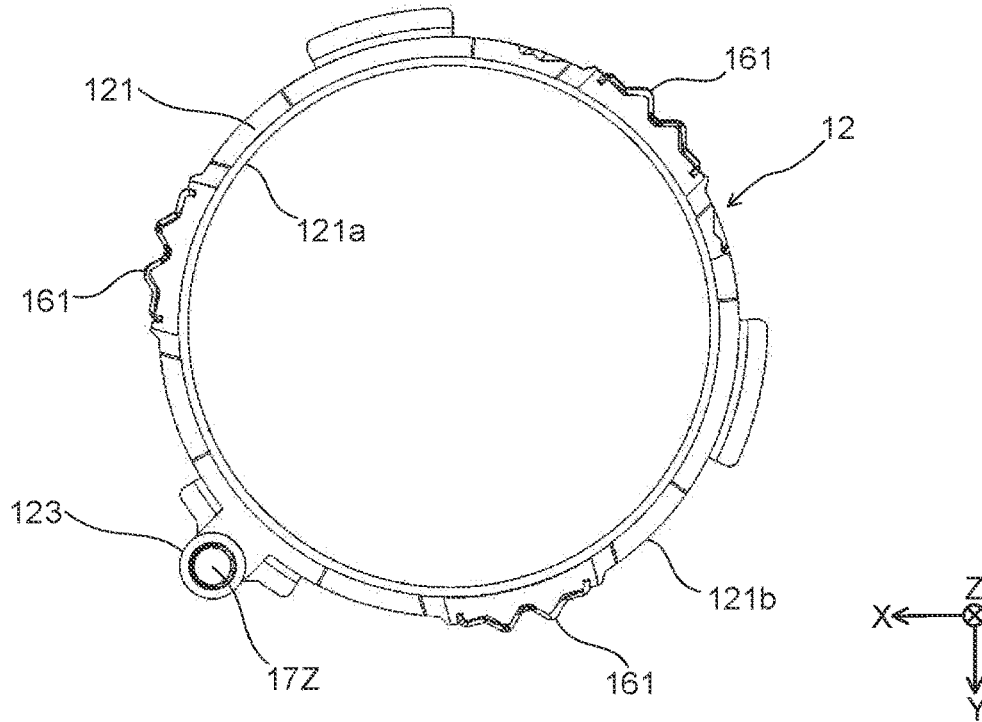
FIG. 14 is a bottom view of the AF movable part.

FIG. 13 is a bottom view of AF movable part 12 and first stage 13. First stage 13 is described below also with reference to FIG. 13.

First stage 13 supports AF movable part 12 through AF supporting parts 16A and 16B. On the optical axis direction imaging side of first stage 13, second stage 14 is disposed through Y-directional reference ball 42. First stage 13 moves in the X direction and the Y direction during the shake correction, and second stage 14 moves only in the X direction during the shake correction.

First stage 13 is a member with a substantially rectangular shape in plan view as viewed from the optical axis direction, and is formed of liquid crystal polymers, for example. First stage 13 includes opening 131 with a substantially circular shape at a portion corresponding to AF movable part 12. Insertion hole 132 corresponding to protruding part 123 of AF movable part 12 is formed in first stage 13 (see FIG. 6).

First stage 13 includes, at the bottom surface, Y-directional reference ball holding part 133 that holds Y-directional reference ball 42 making up OIS supporting part 40 (see FIG. 13). Y-directional reference ball 42 is sandwiched between Y-directional reference ball holding part 133 and Y-directional reference ball holding part 143 of second stage 14 on the opposite side in the Z direction (see FIG. 6).

Y-directional reference ball holding part 133 and Y-directional reference ball holding part 143 are recesses with a rectangular opening extending in the Y direction. Y-directional reference ball holding part 133 and Y-directional reference ball holding part 143 are formed in a substantially U-shaped cross-sectional shape or a substantially v-shaped (tapered) cross-sectional shape of which the groove width decreases toward the bottom surface of the recess, for example.

The groove of the recess with the above-described cross-sectional shape is formed in parallel to the Y direction, and thus Y-directional reference ball 42 sandwiched between Y-directional reference ball holding part 133 and Y-directional reference ball holding part 143 can roll in the Y direction in the recess. That is, second stage 14 in OIS movable part 10 supports first stage 13 in a movable manner in the Y direction through Y-directional reference ball 42.

Y-directional reference ball holding part 133 and Y-directional reference ball holding part 143 are disposed at the portions of the four corners of rectangular first stage 13 and second stage 14, and first stage 13 is supported by second stage 14 by four Y-directional reference balls 42, i.e., four points. In this manner, X-directional reference ball 41 stably rolls in the Y direction because it is sandwiched by multi-point contact.

Note that first stage 13 needs only to be supported by second stage 14 at least at three or more points. For example, in the case where it is supported at three-points, it suffices to dispose Y-directional reference ball holding part 133 and Y-directional reference ball holding part 143 at a total of three locations of two locations on one edge side and one location on the side opposite to the edge of first stage 13 and second stage 14.

At first stage 13, OIS motor fixing part 134 where second OIS driving part 30Y is disposed is formed to recess radially inward such that second OIS driving part 30Y can be installed without protruding radially outward (see FIG. 6). Likewise, at first stage 13, recess 137 where first OIS driving part 30X is disposed is also formed to recess radially inward.

In first stage 13, AF motor fixing parts (reference numeral omitted) are provided at inner peripheral surface 131a of opening 131 at two locations in a point symmetrical manner with respect to the center of opening 131, and AF driving parts 15 are disposed and fixed at the AF motor fixing parts at the two locations.

In addition, second rail members 164 and 165 making up AF supporting parts 16A and 16B are attached to inner peripheral surface 131a of opening 131. Here, as an example, second rail members 164 and 165 are attached at three locations in inner peripheral surface 131a of opening 131. AF supporting parts 16A and 16B provided with second rail members 164 and 165 are described later.

In addition, in first stage 13, Y position detection magnet 17Y is disposed at the bottom surface of one frame portion along the X direction (see FIG. 13). For example, magnet 17Y is magnetized in the Y direction. As described above, at substrate 22, driver IC 221Y including a Y position detection magnetic sensor is disposed at a position facing magnet 17Y in the optical axis direction (see FIGS. 8 and 9 and the like).

In addition, feeding wirings 18Ya, 18Yb, 18Za, 18Zb, 18Zc and 18Zd are embedded by insert molding in first stage 13 (see FIG, for example. 6). Feeding wirings 18Ya, 18Yb, 18Za, 18Zb, 18Zc and 18Zd are exposed from the notch parts (reference numeral omitted) of the four corners of first stage 13, where one end of OIS biasing member 50 is connected.

Inside first stage 13, feeding wirings 18Ya and 18Yb are formed to extend from the notch parts of the four corners to the vicinity of second OIS driving part 30Y as the feeding object, and are connected to second OIS driving part 30Y. In addition, inside first stage 13, feeding wirings 18Za and 18Zb are formed to extend from the notch parts of four corners to the vicinity of one AF driving part 15 as the feeding object, and are connected to the AF driving part 15. In addition, inside first stage 13, feeding wirings 18Zc and 18Zd are formed to extend from the notch parts of four corners to the vicinity of another one AF driving part 15 as the feeding object, and are connected to the AF driving part 15.

With the above-described configurations, power feeding to second OIS driving part 30Y for moving first stage 13 in the Y direction is performed through feeding wirings 18Ya and 18Yb. In addition, power feeding to AF driving part 15 for moving AF movable part 12 in the Z direction is performed through feeding wirings 18Za, 18Zb, 18Zc and 18Zd.

Second Stage

Second stage 14 is a member with a substantially rectangular shape in plan view as viewed from the optical axis direction, and is formed of liquid crystal polymers, for example. Opening 141 of second stage 14 is formed in a substantially rectangular shape (see FIG. 6). In second stage 14, recess 146 where second OIS driving part 30Y is disposed is formed to recess radially inward as with first stage 13. Notch part 147 where first OIS driving part 30X is disposed is formed integrally with the cutout corner portion.

Second stage 14 includes, at the top surface, Y-directional reference ball holding part 143 that holds Y-directional reference ball 42 making up OIS supporting part 40. Here, the overlapping description of Y-directional reference ball holding part 143 will be omitted because it suffices to have the same configuration as that of the above-described Y-directional reference ball holding part 133 disposed opposite to Y-directional reference ball holding part 143.

In addition, second stage 14 includes, at the bottom surface, the X-directional reference ball holding part 144 that holds X-directional reference ball 41 making up OIS supporting part 40 (see FIG. 12). The overlapping description of the X-directional reference ball holding part 144 will be omitted because it suffices to have the same configuration as that of the above-described X-directional reference ball holding part 218 disposed opposite to the X-directional reference ball holding part 144.

In addition, at second stage 14, X position detection magnet 17X is disposed at the bottom surface of one frame portion along the Y direction (see FIG. 12). For example, magnet 17X is magnetized in the X direction. As described above, at substrate 22, driver IC 221X including the X position detection magnetic sensor is disposed at the position facing magnet 17X in the optical axis direction (see FIGS. 8 and 9 and the like).

As described above, in the embodiment, magnet 17X is disposed at second stage 14 that moves in the X direction, and magnet 17Y is disposed at first stage 13 that moves in the Y direction (see FIGS. 12 and 13). During the movement in only the Y direction, first stage 13 moves but second stage 14 does not move and magnet 17X disposed at second stage 14 does not move. Thus, the influence of magnet 17Y during the position detection of magnet 17X in the X direction is eliminated, thus increasing the accuracy.

AF Supporting Part

As described above, first rail member 161 is attached at outer peripheral surface 121b of lens housing part 121 of AF movable part 12, and second rail members 164 and 165 are attached at inner peripheral surface 131a of opening 131 of first stage 13 (see FIG. 6).

AF supporting part 16A has a configuration in which the Z-directional reference ball 162 held by retainer 163 is sandwiched between first rail member 161 and second rail member 164. In addition, AF supporting part 16B has a configuration in which the Z-directional reference ball 162 held by retainer 163 is sandwiched between first rail member 161 and second rail member 165. That is, AF supporting part 16A includes first rail member 161, the Z-directional reference ball 162, retainer 163 and second rail member 164. In addition, AF supporting part 16B includes first rail member 161, the Z-directional reference ball 162, retainer 163 and second rail member 165.

First rail member 161 includes a sandwiching surface (reference numeral omitted) that rotatably sandwiches the Z-directional reference ball 162 when it moves in the Z direction together with AF movable part 12, and a claw part (reference numeral omitted) for attaching at outer peripheral surface 121b of lens housing part 121. The sandwiching surface is a curved surface extending in the optical axis direction, with the center portion curved to recess to the inside of lens housing part 121 in plan view. The claw part is extended toward the inside of lens housing part 121 and disposed at two locations sandwiching the sandwiching surface.

The insertion groove (reference numeral omitted) for inserting the claw part is formed in outer peripheral surface 121b of lens housing part 121. First rail member 161 is attached to outer peripheral surface 121b of lens housing part 121 by inserting and fixing the claw part to the insertion groove.

Second rail member 164 also includes a sandwiching surface (reference numeral omitted) that rotatably sandwiches the Z-directional reference ball 162. The sandwiching surface is a curved surface extending in the optical axis direction, with the center portion curved to recess outward with respect to outer peripheral surface 121b of lens housing part 121 in plan view.

Second rail member 164 is disposed in the groove part (reference numeral omitted) formed in inner peripheral surface 131a of opening 131, and fixed to the groove part by means of adhesive or the like, for example.

Second rail member 165 includes a fixing part (reference numeral omitted) fixed to the recess (reference numeral omitted) formed in inner peripheral surface 131a of opening 131, and an application part (reference numeral omitted) that makes contact with the Z-directional reference ball 162 to apply a biasing force.

The inside (first rail member 161 side) of the application part is a sandwiching surface (reference numeral omitted) that rotatably sandwiches the Z-directional reference ball 162. The sandwiching surface is a curved surface extending in the optical axis direction, with the center portion curved to recess outward with respect to outer peripheral surface 121b of lens housing part 121 in plan view.

The application part is connected to a deformation part disposed at two locations sandwiching the application part. In plan view, the deformation part is formed in a meandering shape, and the deformation parts disposed at two locations are disposed in a line-symmetric manner with the application part sandwiched therebetween. The deformation part formed in the above-mentioned manner is elastically-deformable, and transmits to the application part the restoration force generated by the elastic deformation as the biasing force. That is, second rail member 165 functions as an elastic member.

In the case where three supporting parts are provided, and a combination of two AF supporting parts 16A and one AF supporting part 16B is used, it suffices to provide one AF supporting part 16B that requires the space, thus achieving space-saving and size reduction of the entirety of the device. In addition, since it suffices to provide one second rail member 165 with a complex shape, cost down can be achieved in comparison with a case where a plurality of second rail members 165 are provided.

As an example, retainer 163 holds two Z-directional reference balls 162. With retainer 163, the two Z-directional reference balls 162 are disposed side by side along the optical axis direction, while being positioned in the optical axis direction and held with their distance kept constant. Retainer 163 may include three or more Z-directional reference balls 162 (balls), but in the case where it includes two balls, the diameter of the ball can be increased and the roll resistance of the ball can be reduced in comparison with the case of three or more balls.

Here, as an example, two AF supporting parts 16A and one AF supporting part 16B are disposed, and AF movable part 12 is supported by AF supporting parts 16A and 16B in a movable manner in the Z direction with respect to first stage 13. At inner peripheral surface 131a of opening 131 of first stage 13, AF supporting parts 16A and 16B are separately disposed at least at three locations in the circumferential direction.

In the case where AF supporting parts 16A and 16B are separately disposed at three locations, it is desirable to dispose AF supporting parts 16A and 16B at an angular spacing of 120 degrees, while this angle may be changed as necessary.

In addition, AF supporting parts 16A and 16B may be separately disposed at four or more locations at inner peripheral surface 131a of opening 131, but desirably they are disposed basically by the three-point support that can stably support the object, or by the multiples of three, such as six and nine, points further supporting between the three-point support.

In AF supporting parts 16A and 16B, the Z-directional reference ball 162 is configured to perform pressing and biasing toward first rail member 161 with second rail members 164 and 165. Specifically, the Z-directional reference ball 162 is configured to make contact with first rail member 161 and press and bias it toward the inside of opening 131. Desirably, the pressing force of the Z-directional reference ball 162 pressing first rail member 161 is in the direction toward one point inside opening 131, e.g., the center (the position of the optical axis) of opening 131 as viewed in the optical axis direction, for example.

At inner peripheral surface 131a of opening 131, AF supporting parts 16A and 16B and AF driving part 15 are disposed at positions different from each other. Here, as an example, a total of three AF supporting parts 16A and 16B and a total of two AF driving parts 15 are disposed. More specifically, one AF driving part 15 is disposed between AF supporting part 16A and AF supporting part 16B on one side, and the other AF driving part 15 is disposed between AF supporting part 16A and AF supporting part 16B on the other side. In this case, as with AF supporting parts 16A and 16B, AF driving parts 15 are separately disposed in the circumferential direction at inner peripheral surface 131a of opening 131. Here, AF driving part 15 are disposed at two locations different from the locations of AF supporting parts 16A and 16B in a point symmetrical manner with respect to the center of opening 131.

Since AF supporting parts 16A and 16B are separately disposed in at least three locations in inner peripheral surface 131a of opening 131, first stage 13 can stably support AF movable part 12 through AF supporting parts 16A and 16B. Additionally, the Z-directional reference ball 162 of AF supporting parts 16A and 16B are configured to make contact with first rail member 161 to press and bias it toward the inside of lens housing part 121. In this manner, AF movable part 12 is supported in a movable manner in the optical axis direction while pressing and biasing AF movable part 12 toward the inside of lens housing part 121, and thus the inclination (tilt) of lens part 2 can be suppressed. As a result, first stage 13 AF can stably movably support movable part 12 and lens part 2 through AF supporting parts 16A and 16B.

Note that while AF supporting parts 16A and 16B are configured to use the Z-directional reference ball 162, a roller member may be used instead of the Z-directional reference ball 162. In this case, it suffices to change the shapes and the like of first rail member 161 and second rail members 164 and 165 in accordance with the shape, location and/or the like of the roller member. In addition, it is also possible to use a shaft member extending in the optical axis direction, and a protruding part protruding outward from outer peripheral surface 121b of lens housing part 121 or a protruding part protruding inward from inner peripheral surface 131a of opening 131, instead of the Z-directional reference ball 162 and retainer 163. In this case, it suffices to change the shapes and the like of first rail member 161 and second rail members 164 and 165 such that the shaft member and the protruding part are supported in a slidable manner in the optical axis direction.

Operation of Optical Element Driving Device

In optical element driving device 1, when a voltage is applied to AF driving part 15, AF piezoelectric element vibrates and the AF resonance part resonates and deforms in a behavior corresponding to the frequency. The AF power transmission moves in the Z direction through the deformation of AF resonance part. Along with this, AF movable part 12 moves in the Z direction, thus performing focusing. Since AF supporting parts 16A and 16B include the ball (the Z-directional reference ball 162), AF movable part 12 can smoothly move in the Z direction. In addition, in AF driving part 15, AF power transmission part is in contact with the AF resonance part in a biased state, and as such the movement stroke of AF movable part 12 can be easily lengthened without hindering the height reduction of optical element driving device 1 by only increasing the length of the contact portion in the Z direction.

In addition, in optical element driving device 1, when a voltage is applied to OIS driving part 30, OIS piezoelectric element 32 vibrates and OIS resonance part 31 resonates and deforms in a behavior corresponding to the frequency. OIS power transmission part 34 moves in the X direction and the Y direction through the deformation of OIS resonance part 31. Along with this, OIS movable part 10 moves in the X direction and the Y direction, thus performing shake correction. Since OIS supporting part 40 includes the ball (X-directional reference ball 41 and Y-directional reference ball 42), OIS movable part 10 can smoothly move in the X direction and the Y direction.

More specifically, in the case where second OIS driving part 30Y is driven and this OIS power transmission part 34 moves in the Y direction, the power is transmitted to second stage 14 from first stage 13 where second OIS driving part 30Y is disposed. At this time, X-directional reference ball 41 sandwiched by second stage 14 and base 21 cannot roll in the Y direction, and thus the position of second stage 14 in the Y direction with respect to base 21 is maintained. On the other hand, Y-directional reference ball 42 sandwiched by first stage 13 and second stage 14 can roll in the Y direction, and thus first stage 13 moves in the Y direction with respect to second stage 14. That is, base 21 and second stage 14 serve as the fixing body of the OIS function, and AF part 11 (AF movable part 12 and first stage 13) serves as the movable member of the OIS function.

In addition, in the case where first OIS driving part 30X is driven and this OIS power transmission part 34 moves in the X direction, the power is transmitted to second stage 14 from base 21 where first OIS driving part 30X is disposed. At this time, Y-directional reference ball 42 sandwiched by first stage 13 and second stage 14 cannot roll in the X direction, and thus the position of first stage 13 in the X direction with respect to second stage is maintained. On the other hand, X-directional reference ball 41 sandwiched by second stage 14 and base 21 can roll in the X direction, and thus second stage 14 moves in the X direction with respect to base 21. First stage 13 also moves in the X direction to follow second stage 14. That is, base 21 serves as the fixing body of the OIS function, and AF part 11 (AF movable part 12 and first stage 13) and second stage 14 serve as the movable member of the OIS function.

In this manner, OIS movable part 10 sways in the XY plane, thus performing the shake correction. More specifically, the energization voltage to first OIS driving part 30X and second OIS driving part 30Y is controlled on the basis of a detection signal representing an angle runout from a runout detection part (for example, a gyro sensor) so as to offset the angle runout of camera module A. At this time, the translation movement of OIS movable part 10 can be correctly controlled by feeding back the detection results of X and Y position detection parts composed of the magnetic sensors of driver ICs 221X and 221Y and magnets 17X and 17Y.

Effects

Optical element driving device 1 of the present embodiment uses boost part 60 including inductor L0 and capacitor Ca as a boost part of the driving voltage for AF driving part 15, first OIS driving part 30X and second OIS driving part 30Y. Thus, the inductance of inductor L0 can be reduced without changing the electrical characteristics such as boost voltages and frequency characteristics. Further, since the inductance of inductor L0 can be reduced, the size of inductor L0 can be reduced, and size reduction of optical element driving device 1 can be achieved.

In addition, since optical element driving device 1 of the present embodiment can reduce the size of inductor L0, the influence range of the magnetic flux of inductor L0 is small, and thus the influence on the detection of the magnetic sensors of driver ICs 221X, 221Y and 221Z can be suppressed.

In addition, in optical element driving device 1 of the present embodiment, inductor L0 has a small size and therefore can be disposed at a position not facing magnets 17X, 17Y and 17Z. Thus, the distance (the distance in X and Y directions) between inductor L0 and magnets 17X, 17Y and 17Z can be ensured, and the magnetic influence from inductor L0 can be suppressed. As a result, the influence on the detection of the magnetic sensors of driver ICs 221X, 221Y and 221Z can be suppressed.

In addition, in optical element driving device 1 of the present embodiment, inductor L0 has a small size, and therefore can be disposed at the surface (the bottom surface of substrate 22) of substrate 22 not facing magnets 17X, 17Y and 17Z. Thus, the distance (the distance in the Z direction) between inductor L0 and magnets 17X, 17Y and 17Z can be ensured, and the magnetic influence of inductor L0 can be suppressed. As a result, the influence on the detection of the magnetic sensors of driver ICs 221X, 221Y and 221Z can be suppressed.

In addition, in optical element driving device 1 of the present embodiment, AF driving part 15 is composed of an ultrasound motor together with OIS driving part 30, and thus the influence of external magnetism can be reduced, while achieving size reduction and height reduction with the above-described configuration.

In addition, it is significantly favorable as a dual camera because there is no magnetic influence even when camera modules A provided with optical element driving device 1 are disposed close to each other as in smartphone M illustrated in FIG. 1B.

In addition, since AF movable part 12 is supported by the above-described AF supporting parts 16A and 16B, the movement operation of AF movable part 12 is stabilized, and the driving performance of optical element driving device 1 is remarkably improved.

OTHER EMBODIMENTS

The present invention should not be limited to the above-mentioned embodiment(s), and may be changed within its gist.

For example, in the above-mentioned embodiments, smartphone M is described as an example, but the present invention is applicable to a camera-mounted device including a camera module and an image processing part for processing image information obtained by the camera module. The camera-mounted device includes an information device and a transport device. The information device includes a camera-equipped mobile phone, a note-type personal computer, a tablet terminal, a mobile game machine, a webcamera, and a camera-equipped in-vehicle device (for example, a rear-view monitor device and a drive recorder device), for example. In addition, the transport device includes an automobile, for example.

Figure 18A:
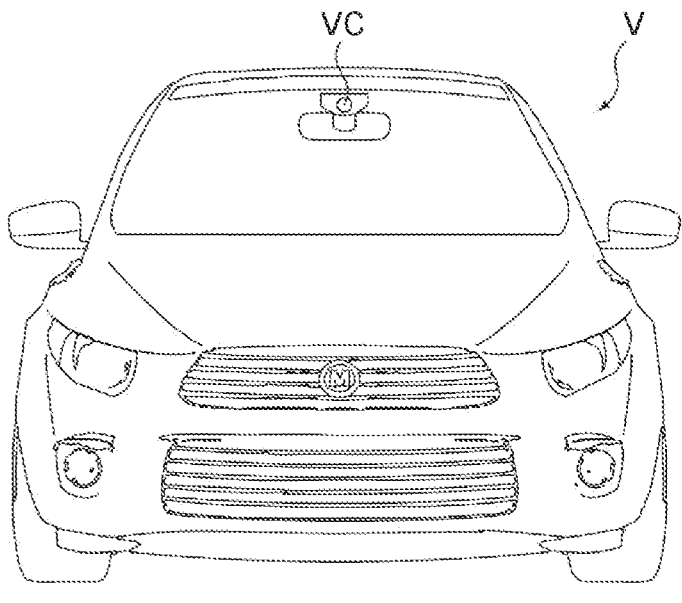
FIG. 18A is a front view illustrating an automobile serving as a camera-mounted device equipped with an in-vehicle camera module.
Figure 18B:
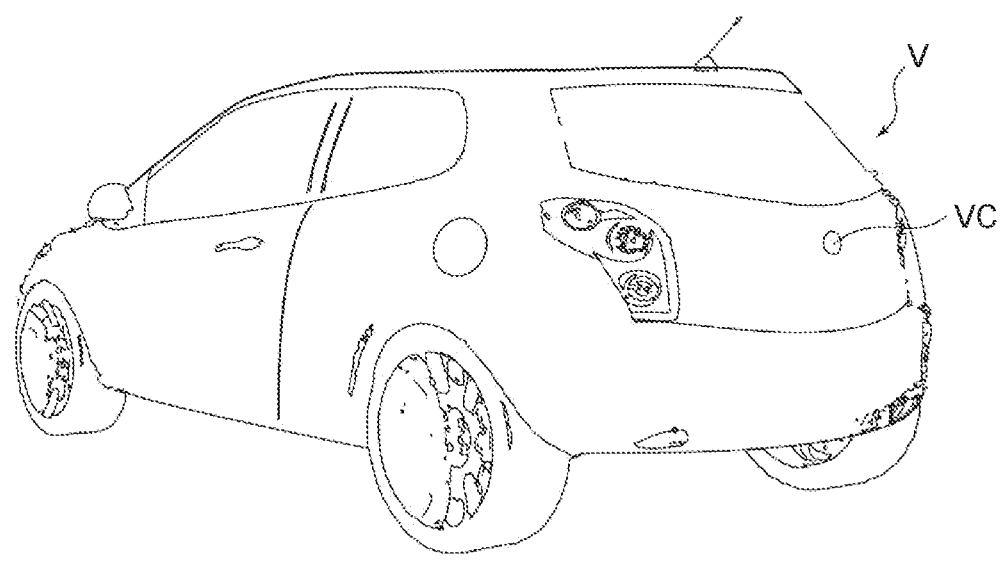
FIG. 18B is a perspective view of the automobile illustrated in FIG. 18A as viewed from an oblique rearward side.

FIGS. 18A and 18B are diagrams illustrating automobile V serving as a camera-mounted device equipped with an in-vehicle camera module VC (Vehicle Camera). FIG. 18A is a front view of automobile V, and FIG. 18B is a rear perspective view of automobile V. Automobile V is equipped with camera module A described in the above-mentioned embodiments as an in-vehicle camera module VC. As illustrated in FIGS. 18A and 18B, in-vehicle camera module VC is attached to the windshield to face forward, and attached to the rear gate to face rearward, for example. The in-vehicle camera module VC is used for rear-view monitors, drive recorders, collision-avoidance control, automated driving control and the like.

In addition, in the above-mentioned embodiments, optical element driving device 1 drives lens part 2 as an optical element, but the optical element to be driven may be optical elements such as mirrors and prisms other than lenses. In addition, it may be applied not only to auto focusing, but also to a case where AF movable part 12 is moved in the optical axis direction such as zooming.

The above is a description of the embodiments and variations of the present invention. The above description is an example of a suitable embodiment of the invention, and the scope of the invention is not limited to this. In other words, the above description of the configuration of the device and the shape of each part is an example, and it is clear that various changes and additions to these examples are possible within the scope of the invention.

This application is entitled to and claims the benefit of Japanese Patent Application No. 2021-138403 filed on Aug. 26, 2021, the disclosure each of which including the specification, drawings and abstract is incorporated herein by reference in its entirety.

INDUSTRIAL APPLICABILITY

The optical element driving device and the camera module according to the present invention are useful when mounted in camera-mounted devices such as smartphones, mobile phones, digital cameras, note-type personal computers, tablet terminals, mobile game machines, and in-vehicle cameras, for example.

REFERENCE SIGNS LIST

1 Optical element driving device
2 Lens part
3 Cover
4 Optical element driving device body
5 Image capturing part
10 OIS movable part (Example of movable part)
11 AF part
12 AF movable part (Example of movable part)
13 First stage
14 Second stage
15 AF Driving part (Example of Driving part)
16A, 16B AF Supporting part
17X, 17Y, 17Z Magnet
18Ya, 18Yb, 18Za, 18Zb, 18Zc, 18Zd Feeding wiring
20 OIS Fixing part
21 Base
21a Bottom surface
22 Substrate
23 Terminal
25Xa, 25Xb Feeding wiring
25Ya, 25Yb, 25Za, 25Zb, 25Zc, 25Zd Feeding wiring
30 OIS driving part (Example of driving part)

30X First OIS driving part
30Y Second OIS driving part
31 OIS resonance part
32 OIS piezoelectric element
34 OIS power transmission part
35 Stage fixing part
40 OIS supporting part
41 X-directional reference ball
42 Y-directional reference ball
50 OIS biasing member
60 Boost part (Example of Boost part)
121 Lens housing part
121*a*, 131*a* Inner peripheral surface
121*b* Outer peripheral surface
123 Protruding part
131, 141, 211, 301, 401 Opening
132 Insertion hole
133 Y-directional reference ball holding part
134 OIS motor fixing part
137 Recess
143 Y-directional reference ball holding part
144 X-directional reference ball holding part
145X, 145Y OIS chucking guide fixing part
147 Notch part
161 First rail member
162 Z-directional reference ball
163 Retainer
164, 165 Second rail member
217 OIS motor fixing part
218 X-directional reference ball holding part
219 Opening
501 Image sensor substrate
502 Imaging element
503 Control part

The invention claimed is:

1. An optical element driving device comprising:
   a movable part configured to hold an optical element;
   a driving part configured to drive the movable part by vibrating a piezoelectric element; and
   a boost part configured to boost an input voltage input to the piezoelectric element, wherein
   the boost part includes an inductor connected in series to the piezoelectric element, and a capacitor connected in parallel to the piezoelectric element
   the movable part includes a magnet; and
   the boost part is disposed at a substrate including a position detection part disposed to face the magnet and configured to magnetically detect a position of the movable part.

2. The optical element driving device according to claim 1, wherein the inductor is disposed at a position not facing the magnet in the substrate.

3. The optical element driving device according to claim 1, wherein
   the position detection part is disposed at a surface of the substrate on a side facing the magnet, and
   the inductor and the capacitor are disposed at a surface of the substrate on a side not facing the magnet.

4. A camera module comprising:
   the optical element driving device according to claim 1; and
   an image capturing part configured to capture a subject image formed by the optical element.

5. A camera-mounted device that is an information device or a transport device, the camera-mounted device comprising:
   the camera module according to claim 4; and
   an image processing part configured to process image information obtained by the camera module.

* * * * *